US012587545B2

(12) United States Patent
Grimm et al.

(10) Patent No.: US 12,587,545 B2
(45) **Date of Patent: \*Mar. 24, 2026**

(54) SECURING ENDPOINTS IN A HETEROGENOUS ENTERPRISE NETWORK

(71) Applicant: Sophos Limited, Abingdon (GB)

(72) Inventors: Moritz Daniel Grimm, Bruchsal (DE); Daniel Stutz, Karlsruhe (DE); Andrew J. Thomas, Oxfordshire (GB); Kenneth D. Ray, Seattle, WA (US)

(73) Assignee: Sophos Limited, Abingdon (GB)

( \* ) Notice: Subject to any disclaimer, the term of this patent is extended or adjusted under 35 U.S.C. 154(b) by 0 days.

This patent is subject to a terminal disclaimer.

(21) Appl. No.: 17/687,958

(22) Filed: Mar. 7, 2022

(65) Prior Publication Data

US 2022/0201017 A1 Jun. 23, 2022

Related U.S. Application Data

(63) Continuation of application No. 15/945,166, filed on Apr. 4, 2018, now Pat. No. 11,271,950.

(51) Int. Cl.
H04L 9/40 (2022.01)

(52) U.S. Cl.
CPC .......... H04L 63/1416 (2013.01); H04L 63/02 (2013.01); H04L 63/1425 (2013.01)

(58) Field of Classification Search
None
See application file for complete search history.

(56) References Cited

U.S. PATENT DOCUMENTS

| | | | |
|---|---|---|---|
| 5,440,723 A | 8/1995 | Arnold et al. |
| 6,463,474 B1 | 10/2002 | Fuh et al. |
| 7,233,989 B2 | 6/2007 | Srivastava et al. |
| 7,307,996 B2 | 12/2007 | Forbes et al. |
| 7,613,207 B2 | 11/2009 | Ayres et al. |
| 7,716,725 B2 | 5/2010 | Xie |
| 7,900,251 B1 | 3/2011 | Cheriton |
| 8,042,147 B2 | 10/2011 | Byres et al. |
| 8,065,712 B1 | 11/2011 | Cheng et al. |
| 8,181,244 B2 | 5/2012 | Boney |

(Continued)

FOREIGN PATENT DOCUMENTS

| | | |
|---|---|---|
| WO | WO-WO2018004600 | 1/2018 |

OTHER PUBLICATIONS

USPTO, "U.S. Appl. No. 16/224,448 Notice of Allowance mailed Mar. 16, 2023", 11 pages.

(Continued)

*Primary Examiner* — Trang T Doan
(74) *Attorney, Agent, or Firm* — Strategic Patents, P.C.

(57) ABSTRACT

Endpoints and a corresponding switch within a heterogeneous network work cooperatively to respond to notifications of compromise in order to protect the enterprise network. Endpoints self-isolate when a local security agent detects a compromise, and shun a compromised one of the other endpoints in response to a corresponding notification. The switch forwards a notice of compromise from an endpoint to a threat management facility for the enterprise network and prevents communications from a compromised endpoint through the switch in response to receiving a corresponding request from the threat management facility.

20 Claims, 13 Drawing Sheets

(56) References Cited

U.S. PATENT DOCUMENTS

| | | | |
|---|---|---|---|
| 8,201,243 B2 | 6/2012 | Boney | |
| 8,312,540 B1 | 11/2012 | Kahn et al. | |
| 8,418,250 B2 | 4/2013 | Morris et al. | |
| 8,458,462 B1 | 6/2013 | Hanna et al. | |
| 8,713,668 B2 | 4/2014 | Cooper et al. | |
| 8,719,932 B2 | 5/2014 | Boney | |
| 8,726,389 B2 | 5/2014 | Morris et al. | |
| 8,763,123 B2 | 6/2014 | Morris et al. | |
| 8,800,024 B2 | 8/2014 | Cooper et al. | |
| 8,850,567 B1 | 9/2014 | Hsieh et al. | |
| 8,856,505 B2 | 10/2014 | Schneider | |
| 8,990,891 B1 | 3/2015 | Chickering et al. | |
| 9,124,636 B1 | 9/2015 | Rathor | |
| 9,137,209 B1 | 9/2015 | Brandwine et al. | |
| 9,413,721 B2 | 8/2016 | Morris et al. | |
| 9,467,475 B2 | 10/2016 | Faltyn et al. | |
| 9,578,045 B2 | 2/2017 | Jaroch et al. | |
| 9,641,434 B1 | 5/2017 | Laurence | |
| 9,680,860 B1 | 6/2017 | Wallace et al. | |
| 9,781,012 B2 | 10/2017 | Brandwine et al. | |
| 9,954,881 B1 | 4/2018 | Lin et al. | |
| 10,091,235 B1 | 10/2018 | Kushwaha et al. | |
| 10,158,480 B1 | 12/2018 | Winklevoss et al. | |
| 10,169,575 B1 | 1/2019 | Lototskiy | |
| 10,230,743 B1 * | 3/2019 | Block | H04L 63/1416 |
| 10,257,224 B2 | 4/2019 | Jaroch et al. | |
| 10,362,057 B1 * | 7/2019 | Wu | H04L 63/1408 |
| 10,673,872 B2 | 6/2020 | Papillon et al. | |
| 2002/0059528 A1 | 5/2002 | Dapp | |
| 2002/0138582 A1 | 9/2002 | Chandra et al. | |
| 2002/0174358 A1 | 11/2002 | Wolff et al. | |
| 2003/0158921 A1 | 8/2003 | Hare et al. | |
| 2003/0177389 A1 | 9/2003 | Albert et al. | |
| 2005/0021740 A1 | 1/2005 | Bar | |
| 2005/0050378 A1 | 3/2005 | Liang | |
| 2005/0171872 A1 | 8/2005 | Burch et al. | |
| 2005/0188222 A1 | 8/2005 | Motsinger et al. | |
| 2005/0216956 A1 | 9/2005 | Orr | |
| 2005/0276228 A1 | 12/2005 | Yavatkar et al. | |
| 2006/0062141 A1 | 3/2006 | Oran et al. | |
| 2006/0101515 A1 | 5/2006 | Amoroso et al. | |
| 2006/0140181 A1 | 6/2006 | Eldar et al. | |
| 2006/0184690 A1 | 8/2006 | Milliken | |
| 2006/0206940 A1 * | 9/2006 | Strauss | G06F 21/55 709/224 |
| 2006/0250968 A1 | 11/2006 | Hudis et al. | |
| 2007/0073631 A1 | 3/2007 | Hinchey et al. | |
| 2007/0079379 A1 | 4/2007 | Sprosts et al. | |
| 2007/0094325 A1 | 4/2007 | Ih et al. | |
| 2007/0169192 A1 | 7/2007 | Main et al. | |
| 2007/0180511 A1 | 8/2007 | Eastlake, III | |
| 2007/0192855 A1 | 8/2007 | Hulten et al. | |
| 2007/0199054 A1 | 8/2007 | Florencio et al. | |
| 2008/0082662 A1 | 4/2008 | Dandliker et al. | |
| 2008/0140795 A1 | 6/2008 | He et al. | |
| 2008/0263647 A1 | 10/2008 | Barnett et al. | |
| 2008/0282335 A1 | 11/2008 | Abzarian et al. | |
| 2008/0289013 A1 | 11/2008 | Burch et al. | |
| 2008/0320116 A1 | 12/2008 | Briggs | |
| 2009/0031423 A1 | 1/2009 | Liu et al. | |
| 2009/0089859 A1 | 4/2009 | Cook et al. | |
| 2009/0178132 A1 | 7/2009 | Hudis et al. | |
| 2009/0228780 A1 | 9/2009 | Mcgeehan | |
| 2010/0257598 A1 | 10/2010 | Demopoulos et al. | |
| 2010/0293610 A1 | 11/2010 | Beachem et al. | |
| 2010/0306845 A1 | 12/2010 | Vaithilingam et al. | |
| 2010/0327054 A1 | 12/2010 | Hammad | |
| 2010/0332664 A1 | 12/2010 | Yevmenkin et al. | |
| 2011/0103394 A1 | 5/2011 | Vogt et al. | |
| 2011/0209196 A1 | 8/2011 | Kennedy | |
| 2011/0277029 A1 | 11/2011 | Natarajan et al. | |
| 2011/0296231 A1 | 12/2011 | Dake | |
| 2011/0307947 A1 | 12/2011 | Kariv et al. | |
| 2011/0314546 A1 | 12/2011 | Aziz et al. | |
| 2012/0005755 A1 | 1/2012 | Kitazawa et al. | |
| 2012/0011589 A1 | 1/2012 | Chen et al. | |
| 2012/0151558 A1 | 6/2012 | Byres et al. | |
| 2012/0210000 A1 | 8/2012 | Wood | |
| 2012/0222114 A1 | 8/2012 | Shanbhogue | |
| 2012/0240224 A1 | 9/2012 | Payne et al. | |
| 2012/0311143 A1 | 12/2012 | Johnsen et al. | |
| 2012/0324245 A1 | 12/2012 | Sinha et al. | |
| 2013/0339736 A1 | 12/2013 | Nayshtut et al. | |
| 2014/0007222 A1 | 1/2014 | Qureshi et al. | |
| 2014/0096229 A1 | 4/2014 | Burns et al. | |
| 2014/0129920 A1 | 5/2014 | Sheretov et al. | |
| 2014/0136896 A1 | 5/2014 | Tak et al. | |
| 2014/0181968 A1 | 6/2014 | Ge et al. | |
| 2014/0269341 A1 | 9/2014 | Gunasekara et al. | |
| 2015/0074807 A1 | 3/2015 | Turbin | |
| 2015/0113600 A1 | 4/2015 | Dulkin et al. | |
| 2015/0121529 A1 | 4/2015 | Quinlan et al. | |
| 2015/0150072 A1 | 5/2015 | Doctor et al. | |
| 2015/0288603 A1 | 10/2015 | Kandasamy et al. | |
| 2015/0312266 A1 * | 10/2015 | Thomas | H04L 65/1033 726/24 |
| 2015/0312268 A1 | 10/2015 | Ray et al. | |
| 2016/0072838 A1 | 3/2016 | Kolton et al. | |
| 2016/0088000 A1 | 3/2016 | Siva Kumar et al. | |
| 2016/0112443 A1 | 4/2016 | Grossman et al. | |
| 2016/0125522 A1 | 5/2016 | Tang et al. | |
| 2016/0164855 A1 | 6/2016 | Johansson et al. | |
| 2016/0188801 A1 | 6/2016 | Tse et al. | |
| 2016/0308762 A1 | 10/2016 | Teng et al. | |
| 2016/0323318 A1 | 11/2016 | Terrill et al. | |
| 2016/0381023 A1 | 12/2016 | Dulce et al. | |
| 2017/0026840 A1 | 1/2017 | Eyal | |
| 2017/0034190 A1 | 2/2017 | May | |
| 2017/0046506 A1 | 2/2017 | Fujii et al. | |
| 2017/0048258 A1 | 2/2017 | Khalil et al. | |
| 2017/0063947 A1 | 3/2017 | Ziskin | |
| 2017/0206351 A1 | 7/2017 | Jay et al. | |
| 2017/0214712 A1 | 7/2017 | Maxwell et al. | |
| 2017/0237753 A1 | 8/2017 | Manning Dawson | |
| 2017/0257315 A1 | 9/2017 | Johnsen et al. | |
| 2017/0272452 A1 | 9/2017 | Kraemer et al. | |
| 2017/0279803 A1 * | 9/2017 | Desai | H04L 67/02 |
| 2017/0279838 A1 | 9/2017 | Dasgupta et al. | |
| 2017/0289191 A1 | 10/2017 | Thioux et al. | |
| 2017/0302535 A1 | 10/2017 | Lee | |
| 2017/0310703 A1 | 10/2017 | Ackerman et al. | |
| 2017/0324616 A1 | 11/2017 | Johnsen et al. | |
| 2017/0339155 A1 | 11/2017 | Isola et al. | |
| 2017/0339177 A1 | 11/2017 | Lorello | |
| 2017/0353308 A1 | 12/2017 | Reitsma et al. | |
| 2017/0353491 A1 | 12/2017 | Gukal et al. | |
| 2018/0198801 A1 | 7/2018 | Gopalakrishna | |
| 2018/0233021 A1 | 8/2018 | Hiebert et al. | |
| 2018/0241760 A1 * | 8/2018 | Stephens | H04L 63/0428 |
| 2018/0288079 A1 | 10/2018 | Muddu et al. | |
| 2018/0332033 A1 | 11/2018 | Lakhani et al. | |
| 2018/0332079 A1 | 11/2018 | Ashley et al. | |
| 2019/0034254 A1 | 1/2019 | Nataraj et al. | |
| 2019/0065747 A1 | 2/2019 | Gomes De Oliveira et al. | |
| 2019/0123904 A1 | 4/2019 | Ackerman et al. | |
| 2019/0124042 A1 | 4/2019 | Thomas et al. | |
| 2019/0124047 A1 | 4/2019 | Thomas et al. | |
| 2019/0124097 A1 | 4/2019 | Thomas et al. | |
| 2019/0124098 A1 | 4/2019 | Thomas et al. | |
| 2019/0124112 A1 | 4/2019 | Thomas et al. | |
| 2019/0149574 A1 | 5/2019 | Thomas et al. | |
| 2019/0297113 A1 * | 9/2019 | Yang | H04L 47/20 |
| 2019/0312838 A1 | 10/2019 | Grimm et al. | |
| 2019/0312839 A1 | 10/2019 | Grimm et al. | |
| 2019/0312843 A1 | 10/2019 | Grimm et al. | |
| 2019/0312887 A1 | 10/2019 | Grimm et al. | |
| 2019/0312888 A1 | 10/2019 | Grimm et al. | |

OTHER PUBLICATIONS

Memon, et al., "Autonomous fault detection and recovery system in large-scale networks", 2016 13th International Computer Conference on Wavelet Active Media Technology and Information Pro-

(56) References Cited

OTHER PUBLICATIONS cessing (ICCWAMTIP) Year: 2016 Conference Paper Publisher: IEEE 2016 , 4 pages.

Gao, et al., "Network Coding Based BSM Broadcasting at Road Intersection in V2V Communication", 2016 IEEE 84th Vehicular Technology Conference (VTC-Fall) Year: 2016 | Conference Paper | Publisher: IEEE 2016 , 5 pages.

Srisuresh, P. et al., "Traditional IP Network Address Translator (Transitional NAT)", Jan. 2001 , 17 pages.

USPTO, "U.S. Appl. No. 15/945,166 Final Office Action mailed May 3, 2021", 22 pages.

USPTO, "U.S. Appl. No. 15/945,166 Non-Final Office Action mailed Oct. 14, 2020", 23 pages.

USPTO, "U.S. Appl. No. 15/945,166 Notice of Allowance mailed Nov. 5, 2021", 15 pages.

USPTO, "U.S. Appl. No. 15/945,226 Non-Final Office Action mailed Nov. 5, 2020", 19 pages.

USPTO, "U.S. Appl. No. 15/945,226 Non-Final Office Action mailed Dec. 11, 2019", 16 pages.

USPTO, "U.S. Appl. No. 15/945,226 Notice of Allowance mailed May 11, 2021", 12 pages.

USPTO, "U.S. Appl. No. 15/945,291 Final Office Action mailed Jul. 12, 2021", 16 pages.

USPTO, "U.S. Appl. No. 15/945,291 Non-Final Office Action mailed Jan. 22, 2021", 17 pages.

USPTO, "U.S. Appl. No. 15/945,291 Non-Final Office Action mailed Jan. 31, 2020", 17 pages.

USPTO, "U.S. Appl. No. 15/945,291 Non-Final Office Action mailed Nov. 24, 2021", 16 pages.

USPTO, "U.S. Appl. No. 15/945,319 Non-Final Office Action mailed Jan. 16, 2020", 7 pages.

USPTO, "U.S. Appl. No. 15/945,346 Non-Final Office Action mailed Feb. 24, 2020", 18 pages.

USPTO, "U.S. Appl. No. 15/945,346 Notice of Allowance mailed Nov. 25, 2020", 11 pages.

USPTO, "U.S. Appl. No. 16/224,218 Final Office Action mailed Jan. 8, 2021", 21 pages.

USPTO, "U.S. Appl. No. 16/224,218 Non-Final Office Action mailed May 17, 2021", 22 pages.

USPTO, "U.S. Appl. No. 16/224,218 Notice of Allowance mailed Jul. 30, 2021", 10 pages.

USPTO, "U.S. Appl. No. 16/224,258 Final Office Action mailed Jun. 29, 2021", 13 pages.

USPTO, "U.S. Appl. No. 16/224,258 Non-Final Office Action mailed Jan. 6, 2021", 9 pages.

USPTO, "U.S. Appl. No. 16/224,258 Notice of Allowance mailed Oct. 27, 2021", 7 pages.

USPTO, "U.S. Appl. No. 16/224,291 Final Office Action mailed May 27, 2021", 12 pages.

USPTO, "U.S. Appl. No. 16/224,291 Non-Final Office Action mailed Oct. 7, 2020", 9 pages.

USPTO, "U.S. Appl. No. 16/224,291 Notice of Allowance mailed Jul. 26, 2021", 8 pages.

USPTO, "U.S. Appl. No. 16/224,319 Final Office Action mailed Sep. 4, 2020", 15 pages.

USPTO, "U.S. Appl. No. 16/224,319 Non-Final Office Action mailed Nov. 7, 2019", 14 pages.

USPTO, "U.S. Appl. No. 16/224,319 Notice of Allowance mailed Jan. 25, 2021", 9 pages.

USPTO, "U.S. Appl. No. 16/224,352 Final Office Action mailed Apr. 9, 2021", 23 pages.

USPTO, "U.S. Appl. No. 16/224,352 Non-Final Office Action mailed Oct. 5, 2021", 23 pages.

USPTO, "U.S. Appl. No. 16/224,352 Non-Final Office Action mailed Dec. 1, 2020", 25 pages.

USPTO, "U.S. Appl. No. 16/224,398 Final Office Action mailed Jun. 28, 2021", 19 pages.

USPTO, "U.S. Appl. No. 16/224,398 Non-Final Office Action mailed Jan. 6, 2021", 16 pages.

USPTO, "U.S. Appl. No. 16/224,398 Non-Final Office Action mailed Jan. 14, 2022", 25 pages.

USPTO, "U.S. Appl. No. 16/224,448 Final Office Action mailed Jan. 21, 2021", 17 pages.

USPTO, "U.S. Appl. No. 16/224,448 Final Office Action mailed Feb. 17, 2022", 19 pages.

USPTO, "U.S. Appl. No. 16/224,448 Non-Final Office Action mailed Aug. 10, 2021", 19 pages.

USPTO, "U.S. Appl. No. 16/224,448 Non-Final Office Action mailed Aug. 21, 2020", 13 pages.

WIPO, "Application No. PCT/US19/25710 International Preliminary Report on Patentability mailed Oct. 15, 2020", 16 pages.

USPTO, "U.S. Appl. No. 15/945,226 Final Office Action mailed Jul. 6, 2020", 20 pages.

USPTO, "U.S. Appl. No. 15/945,291 Final Office Action mailed Jul. 13, 2020", 18 pages.

USPTO, "U.S. Appl. No. 16/224,218 Non-Final Office Action mailed Aug. 14, 2020", 19 pages.

USPTO, "U.S. Appl. No. 16/224,319 Non-Final Office Action mailed May 1, 2020", 13 pages.

USPTO, "U.S. Appl. No. 15/945,319 Notice of Allowance mailed Aug. 4, 2020", 5 pages.

USPTO, "U.S. Appl. No. 15/945,346 Notice of Allowance mailed Aug. 12, 2020", 13 pages.

WIPO, "PCT Application No. PCT/US16/40397 International Preliminary Report on Patentability mailed Jan. 11, 2019", 9 pages.

ISA, "PCT Application No. PCT/US16/40397 International Search Report and Written Opinion mailed Nov. 7, 2016", 13 pages.

ISA, "PCT Application No. PCT/US19/25710 International Search Report and Written Opinion mailed Aug. 6, 2019", 19 pages.

UKIPO, "UK Application No. 1900949.7 Examination Report mailed Sep. 3, 2021", 4 pages.

IPO, "UK Application No. 1900949.7 First Examination Report mailed May 24, 2021", 6 pages.

IPO, "UK Application No. 1901182.4 Search Report mailed Jul. 25, 2019", 4 pages.

UKIPO, "UK Application No. 2015005.8 Search and Examination Report mailed Jan. 5, 2021", 4 pages.

USPTO, "U.S. Appl. No. 15/945,291 Final Office Action mailed May 16, 2022", 17 pages.

USPTO, "U.S. Appl. No. 15/945,291 Notice of Allowance mailed Sep. 14, 2022", 15 pages.

USPTO, "U.S. Appl. No. 15/945,291 Notice of Allowance mailed Nov. 9, 2022", 14 pages.

* cited by examiner

1100

OPERATE NETWORK DEVICE
1102

DETECT COMPROMISE
1104

BLOCK TRAFFIC AT NETWORK DEVICE
1106

MANAGE HEALTHY ENDPOINTS
1108

REMEDIATE COMPROMISED ENDPOINT
1110

REGISTER ENDPOINT
1302

DETERMINE ADAPTER PROFILE
1304

DETECT COMPROMISE
1306

BLOCK NETWORK ADAPTERS
IN ADAPTER PROFILE
1308

REMEDIATE COMPROMISED
ENDPOINT
1310

1300

SECURING ENDPOINTS IN A HETEROGENOUS ENTERPRISE NETWORK

RELATED APPLICATIONS

This application is a continuation of U.S. patent application Ser. No. 15/945,166 filed on Apr. 4, 2018 (now U.S. Pat. No. 11,271,950), the entire content of which is hereby incorporated by reference.

This application is related to the following commonly-owned U.S. Patent applications filed on Apr. 4, 2018 and incorporated herein by reference in their entirety: U.S. patent application Ser. No. 15/945,226 filed on Apr. 4, 2018 (now U.S. Pat. No. 11,140,195) entitled "Secure Endpoint in a Heterogenous Enterprise Network," U.S. patent application Ser. No. 15/945,291 entitled "Network Device for Securing Endpoints in a Heterogeneous Enterprise Network," U.S. patent application Ser. No. 15/945,319 (now U.S. Pat. No. 10,862,864) entitled "Network Device with Transparent Heartbeat Processing," and U.S. patent application Ser. No. 15/945,346 (now U.S. Pat. No. 10,972,431) entitled "Device Management based on Groups of Network Adapters."

BACKGROUND

Enterprise networks can contain valuable information that forms an increasingly attractive target for malicious actors. Access to enterprise networks is often restricted in order to limit the risk posed by such malicious actors, and tools such as anti-virus software and behavioral monitoring are used to secure endpoints against malicious activity. However, as enterprise networks become more complex and as networked devices become increasingly ubiquitous and diverse, securing endpoints can require significant administrator resources. Thus, there remains a need for techniques to secure endpoints in heterogeneous enterprise networks.

SUMMARY

A variety of techniques are employed to secure endpoints in heterogeneous enterprise networks.

Endpoints within a subnet of a heterogeneous network are configured to cooperatively respond to internal or external notifications of compromise in order to protect the endpoints within the subnet and throughout the enterprise network. For example, each endpoint may be configured to self-isolate when a local security agent detects a compromise, and to shun one of the other endpoints in response to a corresponding notification of compromise in order to prevent the other, compromised endpoint from communicating with other endpoints and further compromising other endpoints either within the subnet or throughout the enterprise network.

In one aspect, a system disclosed herein may include an enterprise network including a gateway to an external network, the enterprise network separated by routers into a number of logical subnets each having a different routing prefix, a plurality of endpoints interconnected in a subnet of the enterprise network, each of the endpoints configured by a local security agent to self-isolate in response to a local detection of compromise, and to shun one of the other endpoints in the subnet in response to a notification of compromise of the one of the other endpoints, and a network address translation device coupled in a communicating relationship with the subnet and the gateway, the network address translation device configured to manage communications between the subnet and the enterprise network, and the network address translation device configured to forward the notification of compromise from the gateway to one or more of the plurality of endpoints in the subnet identifying one or more other ones of the plurality of endpoints in the subnet for which a compromise is detected.

The system may further include a threat management facility coupled in a communicating relationship with the gateway, the threat management facility configured to monitor the plurality of endpoints and to create the notification of compromise when a compromised endpoint is detected. The threat management facility may be a remote threat management facility accessible to the gateway through the external network. The threat management facility may be a local threat management facility executing within the enterprise network.

In one aspect, a system disclosed herein may include a plurality of endpoints interconnected in a subnet of an enterprise network, each of the endpoints configured by a local security agent to self-isolate in response to a local detection of compromise, and to shun one of the other endpoints in response to a notification of compromise of the one of the other endpoints, and a network device coupled in a communicating relationship with the subnet and an internetwork, the network device configured to manage communications between the subnet and the internetwork, and the network device configured to forward the notification of compromise to one or more of the plurality of endpoints identifying one or more other ones of the plurality of endpoints for which a compromise is detected.

The network device may receive the notification of compromise from a firewall for the enterprise network. The network device may receive the notification of compromise from one of the plurality of endpoints. The network device may include a switch. The network device may include a router. The network device may include a firewall. The network device may include a wireless access point. The network device may include a network address translation device. The system may further include a threat management facility configured to coordinate a remediation of one or more other ones of the plurality of endpoints for which a compromise is detected. The system may further include a threat management facility coupled in a communicating relationship with the network device, the threat management facility configured to monitor the plurality of endpoints and create the notification of compromise when a compromised endpoint is detected. The threat management facility may be a remote threat management facility accessible to the network device through an external network. The threat management facility may be a local threat management facility executing within the enterprise network. The threat management facility may monitor a heartbeat from each of the plurality of endpoints, where the threat management facility is configured to detect the compromise based on at least one of contents of the heartbeat or an absence of the heartbeat. The subnet may be a logical subnet having a different routing prefix than a remaining portion of the enterprise network. The subnet may be a physical subnet having a different routing prefix than a remaining portion of the enterprise network. The endpoints may include at least one of a desktop computer, a laptop computer, a mobile phone, and a tablet.

An endpoint in an enterprise network is configured to respond to internal and external detections of compromise in a manner that permits the endpoint to cooperate with other endpoints to secure the enterprise network. For example, the endpoint may be configured to self-isolate when local monitoring detects a compromise on the endpoint, and to respond to an external notification of compromise of another endpoint by restricting communications with that other endpoint.

In one aspect, a computer program product disclosed herein may include non-transitory computer readable code embodied in a computer readable medium that, when executing on an endpoint in an enterprise network, performs the steps of detecting a compromised state by locally monitoring the endpoint for a presence of malware, and in response to the compromised state, notifying a network device for the enterprise network of the compromised state and restricting communications between the endpoint and one or more other endpoints on a subnet of the enterprise network, and receiving a notification of a compromise of one of the other endpoints on the subnet of the enterprise network from the network device where the notification of the compromise includes an identification of an IP address of the one of the other endpoints in the subnet, and in response to the notification of the compromise, restricting communications from the IP address of the one of the other endpoints within the subnet of the enterprise network.

In another aspect, a system disclosed herein may include a processor on an endpoint, a network interface for coupling the endpoint in a communicating relationship with an enterprise network, and a memory bearing instructions executable by the processor to provide a security agent for the endpoint, the security agent configured to self-isolate the endpoint by performing the steps of detecting a compromised state of the endpoint, and in response to the compromised state, notifying a network device for the enterprise network of the compromised state and restricting communications between the endpoint and one or more other endpoints on the enterprise network, the security agent further configured to shun other endpoints in the enterprise network by performing the steps of receiving a notification of a compromise of one of the other endpoints on the enterprise network from the network device, and in response to the notification of the compromise, restricting communications from the one of the other endpoints within the enterprise network.

The endpoint may be coupled to a subnet of the enterprise network. One or more other endpoints may be coupled to the subnet of the enterprise network. The network device may include a network address translation device between the endpoint and a firewall for the enterprise network. The network device may include at least one of a router, a switch, and a wireless access point. The network device may include a gateway to an external network. The network device may include a threat management facility for managing security of the enterprise network. The notification of the compromise may include an identification of an IP address of the one of the other endpoints, and restricting communications from one of the other endpoints may include restricting communications from the IP address. The notification of the compromise may include an identification of one or more network adapters of the one of the other endpoints, and restricting communications from one of the other endpoints may include restricting communications using any of the one or more network adapters. The memory may bear instructions executable by the processor to perform the steps of determining a MAC address of one of the other endpoints on the subnet and reporting the MAC address to a firewall for the enterprise network. The firewall may be separated from the endpoint by a network address translation device. The firewall may be separated from the endpoint by one or more other network devices. Detecting the compromised state may include detecting a credential theft attempt on the endpoint. Detecting the compromised state may include detecting a lateral movement attempt including attempted access from the endpoint to one of the other endpoints in the enterprise network. Detecting the compromised state may include detecting an attempted exfiltration of data from the endpoint. Detecting the compromised state may include detecting malware executing on the endpoint. The system may further include a threat management facility configured to coordinate a remediation of the compromised state.

In one aspect, a method for operating an endpoint in an enterprise network disclosed herein may include detecting a compromised state, and in response to the compromised state, notifying a network device for the enterprise network of the compromised state and restricting communications between the endpoint and one or more other endpoints on the enterprise network, and receiving a notification of a compromise of one of the other endpoints on the enterprise network from the network device, and in response to the notification of the compromise, restricting communications from the one of the other endpoints within the enterprise network. Detecting the compromised state may include detecting malware executing on the endpoint with an anti-virus scanner.

A network address translation device or similarly situated network device can cooperate with endpoints on a subnet of an enterprise network to secure endpoints within the subnet. For example, the network address translation device may be configured, either alone or in cooperation with other network devices, to block traffic from a compromised endpoint to destinations outside the subnet, and to direct other endpoints within the subnet to stop network communications with the compromised endpoint.

In one aspect, a computer program product disclosed herein may include computer executable code embodied on a non-transitory computer readable medium that, when executing on one or more processors of a network translation device that couples a subnet including a plurality of endpoints to an enterprise network, causes the network translation device to perform the steps of translating address information between a first routing prefix for the subnet and a second routing prefix for a network external to the subnet, detecting a compromised one of the plurality of endpoints on the subnet based on an error in a heartbeat from the one of the plurality of endpoints, blocking traffic between the compromised one of the plurality of endpoints and the enterprise network outside the subnet, and directing one or more of the plurality of endpoints other than the compromised one of the plurality of endpoints to stop network communications on the subnet with the compromised one of the plurality of endpoints.

The error in the heartbeat may include an omission of an expected heartbeat. The error in the heartbeat may include an error in content of the heartbeat.

In one aspect, a method for operating a network device that couples a subnet including a plurality of endpoints to an enterprise network disclosed herein may include detecting a compromised one of the plurality of endpoints on the subnet, blocking traffic between the compromised one of the plurality of endpoints and the enterprise network outside the subnet, and directing one or more of the plurality of endpoints other than the compromised one of the plurality of endpoints to stop network communications on the subnet with the compromised one of the plurality of endpoints.

Detecting the compromised one of the plurality of endpoints may include receiving a notification from the compromised one of the plurality of endpoints. Detecting the compromised one of the plurality of endpoints may include receiving a notification from one of the plurality of endpoints other than the compromised one of the plurality of endpoints. Detecting the compromised one of the plurality of endpoints may include detecting potentially malicious traffic to or from the compromised one of the plurality of endpoints at the network device. The method may further include querying each of the endpoints coupled to the subnet to identify a source of the potentially malicious traffic. The method may further include, when the source is identified, preventing communications through the network device by the source, and when the source is not identified, preventing communications by any of the endpoints through the network device. Detecting the compromised one of the plurality of endpoints may include receiving a notification from a firewall in the enterprise network outside the subnet. The method may further include, in response to detecting the compromised one of the plurality of endpoints, directing communications from one or more of the plurality of endpoints other than the compromised one of the plurality of endpoints through a virtual private network. The virtual private network may physically pass through the network device. The virtual private network may physically circumvent the network device. The method may further include determining a security status of each of the one or more of the plurality of endpoints other than the compromised one of the plurality of endpoints and permitting network communications through the network device only from devices meeting one or more security conditions. The one or more security conditions may include a presence of a secure heartbeat. The one or more security conditions may include an indication of security compliance from a local security agent. The method may further include translating network traffic at the network device between a first routing prefix for the subnet and a second routing prefix for a network external to the subnet. The network device may include a network address translation device. The network device may include at least one of a router and a gateway.

In one aspect, a network device disclosed herein may include a first network interface to an external network, a second network interface to a subnet, one or more processors, and a memory bearing instructions executable by the one or more processors to translate network traffic between a first routing prefix for the external network and a second routing prefix for the subnet, the memory further bearing instructions executable by the one or more processors to secure a plurality of endpoints connected to the subnet by detecting a compromised one of the plurality of endpoints on the subnet, blocking traffic between the compromised one of the plurality of endpoints and the external network outside the subnet, and directing one or more of the plurality of endpoints other than the compromised one of the plurality of endpoints to stop network communications on the subnet with the compromised one of the plurality of endpoints.

Network devices within an enterprise are configured to pass out-of-band security information such as heartbeats, notifications of compromise, device identification information, and so forth between logical or physical network partitions such as subnets, routing domains, access points, and so forth. This technique can advantageously facilitate integrated management of endpoints across network boundaries that might otherwise interfere with the identification and management of specific devices.

In one aspect, a network device disclosed herein may include a first network interface coupled to an enterprise network, a second network interface coupled to a subnet of the enterprise network, and a processor configured by computer executable code stored in a memory and executable by the processor to manage network communications between the enterprise network and endpoints coupled to the subnet, where the processor is configured to pass out-of-band information from one of the endpoints coupled to the subnet to a security infrastructure for the enterprise network, and to pass out-of-band security control information from the security infrastructure to one or more of the endpoints coupled to the subnet.

The network device may include at least one of a firewall, a switch, and a router. The network device may include a network address translation device. The processor may be configured to translate network traffic between a first routing prefix for the enterprise network and a second routing prefix for the subnet of the enterprise network. The out-of-band information from one of the endpoints may include a secure heartbeat. The secure heartbeat may be responsive to a query from a threat management facility. The secure heartbeat may include security status information for the one of the endpoints. The secure heartbeat may include network identification information for the one of the endpoints. The out-of-band information from one of the endpoints may include local subnet identification information for identifying a location of the one of the endpoints outside the subnet. The local subnet identification information may include a media access control address for one of the endpoints. The local subnet identification information may include a subnet internet protocol address for the one of the endpoints. The local subnet identification information may include a five-tuple for one of the endpoints including a source IP address, a destination IP address, a source port number, a destination port number, and an IP protocol number associated with a network connection. The out-of-band information may include an SSH fingerprint for one of the endpoints. The out-of-band security control information may include an isolation command instructing one of the endpoints to stop communications with a second one of the endpoints coupled to the subnet. The processor may be configured to convert a network address for the second one of the endpoints into an internet protocol address for the second one of the endpoints on the subnet. The processor may be configured to convert a network address for the second one of the endpoints on the subnet into a media access control address for the second one of the endpoints on the subnet. The out-of-band security control information may include a request for network identification information. The out-of-band security control information may include a request for security status. The security infrastructure may include a firewall for the enterprise network. The security infrastructure may include a threat management facility for the enterprise network.

Secure management of an enterprise network is improved by creating a network adapter fingerprint for an endpoint that identifies all of the network adapters for that endpoint. With this information, the location and connectivity of the endpoint can be tracked and managed independent of the manner in which the endpoint is connecting to the enterprise network.

In one aspect, a computer program product for managing endpoints disclosed herein may include non-transitory computer executable code embodied on a computer readable medium that, when executing one or more computing devices, performs the steps of registering an endpoint to an enterprise network, where registering includes ensuring that the endpoint is compliant with a security policy for the enterprise network, determining a network adapter profile for the endpoint, the network adapter profile including a plurality of media access control identifiers for a plurality of network adapters used by the endpoint for network communications, detecting a compromised state of the endpoint at a threat management facility of an enterprise network, where the compromised state brings the endpoint out of compliance with the security policy, and blocking network communications by all of the network adapters in the network adapter profile at one or more firewalls of the enterprise network.

Detecting the compromised state may include detecting malware on the endpoint. Detecting the compromised state may include detecting potentially malicious behavior of software executing on the endpoint. Registering the endpoint may include registering the endpoint in a device database through a device management portal for the enterprise network. The one or more firewalls may include a firewall on a gateway between the enterprise network and an external network. The one or more firewalls may include a firewall on a router in the enterprise network. The one or more firewalls may include a firewall on a network address translation device. Determining the network adapter profile may include extracting adapter information from a heartbeat received from the endpoint. Determining the network adapter profile may include querying the endpoint from a network device for the enterprise network. The plurality of network adapters may include at least one of a wireless network interface, a network interface card, a universal serial bus controller, a Bluetooth interface, and a cellular network interface. Detecting the compromised state may include receiving a notification from the endpoint of the compromised state. Detecting the compromised state may include detecting potentially malicious network communications to or from the endpoint.

In one aspect, a method for managing endpoints disclosed herein may include registering an endpoint to an enterprise network, determining a network adapter profile for the endpoint, the network adapter profile including a plurality of media access control identifiers for a plurality of network adapters used by the endpoint for network communications, detecting a compromised state of the endpoint at a threat management facility of an enterprise network, and blocking network communications by all of the network adapters in the network adapter profile at one or more firewalls of the enterprise network.

The one or more firewalls may include a firewall on at least one of a gateway, a router, and a network address translation device. Registering the endpoint to the enterprise network may include bringing the endpoint into compliance with a security policy for the enterprise network. Determining the network adapter profile may include extracting adapter information from a heartbeat received from the endpoint. Determining the network adapter profile may include querying the endpoint from a network device for the enterprise network. The plurality of network adapters may be associated with one or more of a wireless network interface, a network interface card, a universal serial bus controller, and a cellular network interface. Detecting the compromised state may include at least one of receiving a notification from the endpoint and detecting potentially malicious network communications to or from the endpoint.

In one aspect, a network device disclosed herein may include a first network interface coupled to an enterprise network, a second network interface coupled to a subnet of the enterprise network, and a processor configured by computer executable code stored in a memory and executable by the processor to manage network connectivity for a plurality of endpoints coupled to the subnet, where the processor is further configured to secure the enterprise network against access by compromised endpoints by performing the steps of registering an endpoint to the enterprise network, determining a network adapter profile for the endpoint, the network adapter profile including a plurality of media access control identifiers for a plurality of network adapters used by the endpoint for network communications, detecting a compromised state of the endpoint at a threat management facility of an enterprise network, and blocking network communications by all of the network adapters in the network adapter profile at one or more firewalls of the enterprise network.

BRIEF DESCRIPTION OF THE FIGURES

The foregoing and other objects, features and advantages of the devices, systems, and methods described herein will be apparent from the following description of particular embodiments thereof, as illustrated in the accompanying drawings. The drawings are not necessarily to scale, emphasis instead being placed upon illustrating the principles of the devices, systems, and methods described herein.

DETAILED DESCRIPTION

Figure 1:
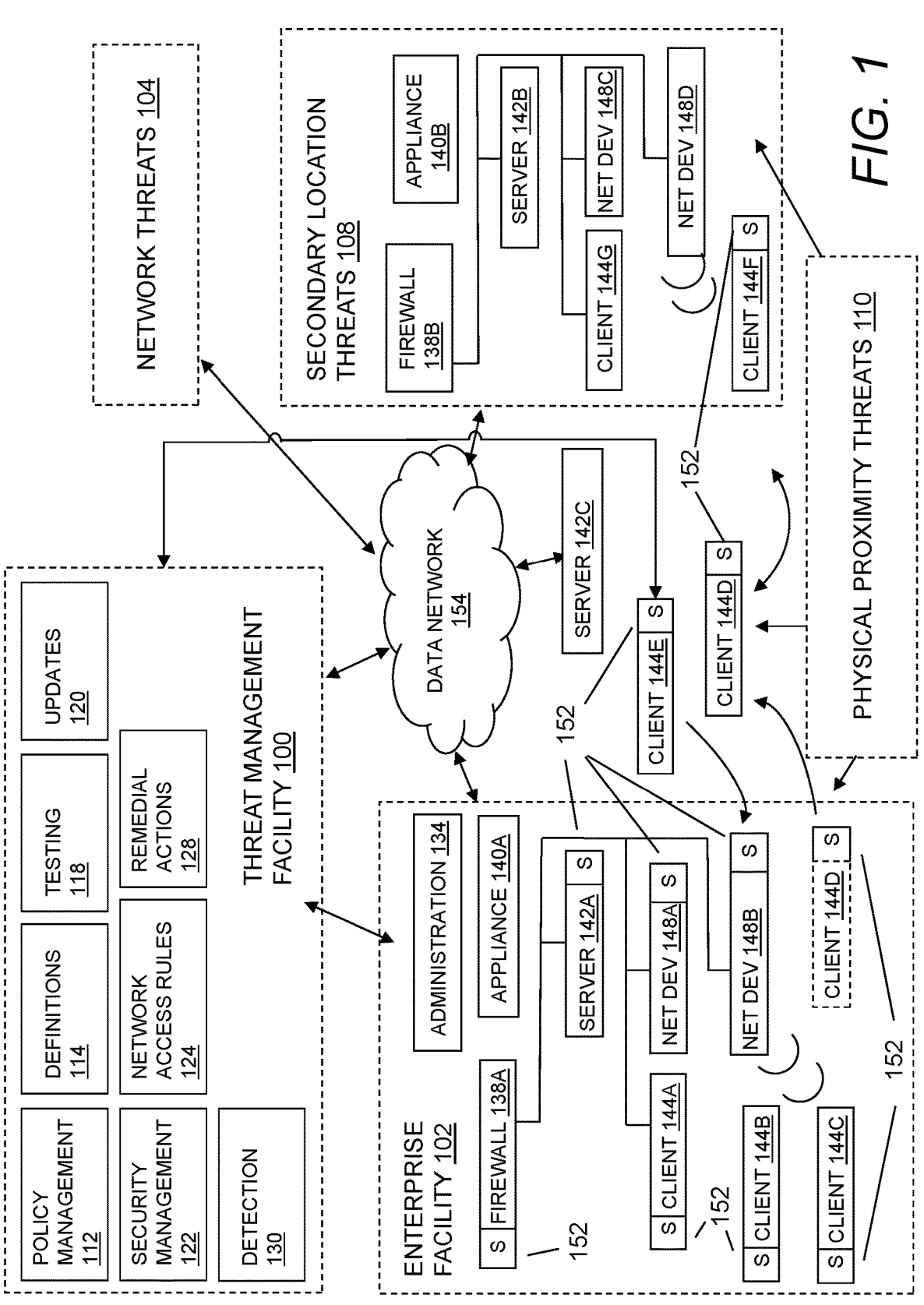
FIG. 1 illustrates an environment for threat management.

Embodiments will now be described with reference to the accompanying figures, in which preferred embodiments are shown. The foregoing may, however, be embodied in many different forms and should not be construed as limited to the illustrated embodiments set forth herein.

All documents mentioned herein are hereby incorporated by reference in their entirety. References to items in the singular should be understood to include items in the plural, and vice versa, unless explicitly stated otherwise or clear from the context. Grammatical conjunctions are intended to express any and all disjunctive and conjunctive combinations of conjoined clauses, sentences, words, and the like, unless otherwise stated or clear from the context. Thus, the term "or" should generally be understood to mean "and/or" and so forth.

Recitation of ranges of values herein are not intended to be limiting, referring instead individually to any and all values falling within the range, unless otherwise indicated herein. Furthermore, each separate value within such a range is incorporated into the specification as if it were individually recited herein. The words "about," "approximately," or the like, when accompanying a numerical value, are to be construed as indicating a deviation as would be appreciated by one of ordinary skill in the art to operate satisfactorily for an intended purpose. Ranges of values and/or numeric values are provided herein as examples only, and do not constitute a limitation on the scope of the described embodiments. The use of any and all examples, or exemplary language ("e.g.," "such as," or the like) provided herein, is intended merely to better illuminate the embodiments and does not pose a limitation on the scope of the embodiments or the claims. No language in the specification should be construed as indicating any unclaimed element as essential to the practice of the embodiments.

In the following description, it is understood that terms such as "first," "second," "third," "above," "below," and the like, are words of convenience and are not to be construed as limiting terms unless expressly state otherwise.

The phrase, "heterogeneous network," and similar terms or phrases as used herein, is intended to refer to networks containing or using various combinations of network devices, endpoints types, protocols, communications mediums, communications fabric, and so forth. For example, a heterogeneous network may include networks that connect devices that use different operating systems and/or protocols. A heterogeneous network may also or instead include different types of endpoints including virtual machines, mobile devices, desktop computers, servers, smart phones, and Internet-of-Things (IoT) devices such as smart appliances, smart speakers, cameras, physical security systems, physiological monitoring devices, and so forth. This can pose particular difficulties where, for example, different devices have different processing capabilities, network access interfaces and so forth. For example, certain devices may be configured for access through a web server that permits user access and configuration through a web-based interface but does not provide for programmatic access and control. Other devices may be configured for connection through short range RF interfaces and low-level device drivers running on a desktop or other network-connected device. Still other machines may be configured to connect to a wireless network through Wireless Protected Setup or any other proprietary or standardized protocol. Heterogeneous networks may also or instead include networks with different physical or logical configurations including, e.g., arrangements of access points, routers, switches, network address translation devices, gateways, firewalls, and so forth. Heterogeneous networks may also or instead include any number or configuration of remote devices accessing an enterprise network, e.g., through a virtual private network, cellular data connection, network server, cloud-based service, or the like. Heterogeneous networks may also or instead include network devices and endpoints from multiple different vendors.

In the context of a network containing a mixture of such endpoints, network devices, and other computing devices, it may be difficult or impossible to bring certain devices into compliance with a network policy. For example, it may be impossible to install a security agent on a smart appliance to ensure safe, malware-free local execution of software. As another example, device identification information may be lost as communications pass through a network address translation device or through a combination of different network devices from different vendors, thus rendering secure management of network communications among devices within the network, and with devices or services outside of an enterprise network, more challenging. Disclosed herein are a variety of techniques for securing endpoint operation and network communications in a heterogeneous network for an enterprise.

FIG. 1 illustrates an environment for threat management. Specifically, FIG. 1 depicts a block diagram of a threat management system providing protection to an enterprise against a plurality of threats—a context in which the following techniques may usefully be deployed. In general, a policy management facility 112 may be used to manage the policies for some or all of the corporate computing assets in the enterprise, and a threat management facility 100 may be used distribute such policies and to monitor compliance therewith. The threat management facility 100 may provide multiple security and management services instead of or in addition to policy management.

The threat management facility 100 may provide an enterprise facility 102 such as an enterprise network with protection from computer-based malware, including viruses, spyware, adware, Trojans, intrusion, spam, policy abuse, uncontrolled access, and the like. The enterprise facility 102 may, for example, be a facility including computer and network resources for any corporate, commercial, educational, or governmental enterprise or the like. The enterprise facility 102 may include a computer network, which may be at a single physical facility or distributed amongst a plurality of facilities and in a plurality of geographical locations. The enterprise facility 102 may include an administration system 134, a firewall 138A, an appliance 140A, a server 142A, network devices 148A-B, clients 144A-D, and the like. The aforementioned devices within the enterprise facility 102 may be protected by endpoint computer security facilities 152. It will be understood that any reference herein to client facilities may include the clients 144A-D shown in FIG. 1 and vice-versa.

The threat management facility 100 may provide a plurality of functions through components or platforms such as security management facility 122, a policy management facility 112, an update facility 120, a definitions facility 114, a network access rules facility 124, a remedial action facility 128, a detection techniques facility 130, a testing facility 118, a threat research facility 132, and the like. In embodiments, the threat management facility 100 may provide threat management functions beyond the network boundaries of the enterprise facility 102 to include, e.g., clients 144D connected to network resources that are not directly associated with or controlled by the enterprise facility 102. Threats to client facilities may come from a plurality of sources, such as from network threats 104, physical proximity threats 110, secondary location threats 108, and the like. Clients 144A-D may be protected from threats even when the located beyond the enterprise 102 facility, such as when a client 144E-F moves in and out of the enterprise facility 102, for example when interfacing with an unprotected server 142C through the data network 154, or when a client 144F is moving into an area posing secondary location threats 108 such as when interfacing with components 140B, 142B, 148C, 148D that are not protected.

The threat management facility 100 may operate as a stand-alone security solution, or the threat management facility 100 may be integrated into or cooperate with one or more third-party products such as commercial libraries of known vulnerabilities and exploits or commercial providers of virus definitions, remediations and so forth.

The security management facility 122 may be operable to scan clients 144A-D on machines operating within the enterprise facility 102, or clients 144E-F otherwise managed by the threat management facility 100, for malicious code, to remove or quarantine certain applications and files, to prevent certain actions, to perform remedial actions, and to perform other security measures. In embodiments, scanning the clients 144A-D and/or 144E-F may include scanning some or all of the files stored thereon at any suitable time(s). For example, this may include scanning on a periodic basis, scanning an application when the application is executed, scanning files as the files are transmitted to or from one of the clients 144A-F, or the like. The scanning of the applications and files may be performed to detect known malicious code or known unwanted applications. In general, new malicious code and unwanted applications are continually developed and distributed, and the known code database for the security management facility 122 may be updated on a periodic basis, on an on-demand basis, on an alert basis, or the like.

The security management facility 122 may provide email security to protect against spam, viruses, spyware and phishing, and the like, as well as management or control of email content. Email security and control may also or instead protect against inbound and outbound threats, protect email infrastructure, prevent data leakage, provide spam filtering, and the like. The security management facility 122 may also or instead provide web security, e.g., to help protect against exposure to viruses, spyware, malware, unwanted applications, and the like during web browsing activity, and to otherwise control or manage web browsing. Web security measures may include Internet use policies, reporting on suspect devices, security and content filtering, active monitoring of network traffic, URI filtering, and the like. The security management facility 122 may also or instead provide network access control, including control over network connections, e.g., to stop unauthorized, guest, or non-compliant systems from accessing networks through the enterprise facility 102, or to control network traffic into and out of the enterprise facility 102. This may also or instead include controlling access to virtual private networks (VPNs) that provide a communications network tunneled through another network.

The security management facility 122 may provide host intrusion prevention through behavioral based protection, which may guard against unknown threats by analyzing behavior before software code executes. Behavioral based protection may monitor code when it runs and intervene if the code is deemed to be suspicious or malicious. Behavioral protection, as distinguished from runtime protection, can advantageously identify malicious code at a gateway or file servers and delete the code before it can reach endpoint computers and the like.

The security management facility 122 may provide reputation filtering to target or identify sources of known malware. For instance, reputation filtering may use lists of URIs of known sources of malware or known suspicious IP addresses, or domains that, when detected, invoke an action by the threat management facility 100, such as dropping packets, terminating connections or taking other remedial action. By dropping the source before any interaction can occur, potential threat sources may be thwarted before any exchange of data can be made.

The policy management facility 112 may manage access rules and policies that are distributed throughout the enterprise facility 102 to manage and control use of network resources by client facilities 144A-F. The policies may be defined or organized by application type, application capabilities, organization hierarchy, computer facility type, user type, network location, time of day, connection type, and so forth. Policies may be maintained by the administration facility 134, through the threat management facility 100. For example, a policy may restrict IM activity to communications with customers by support personnel. In general, the policy management facility 112 may operate as a standalone application deployed within the enterprise 102 (e.g., as a service of the network server 142) or remotely as a cloud service, as an application on the client facilities 144A-F, or some combination of these.

The threat management facility 100 may provide configuration management services for managing the configuration of applications, operating systems, hardware, and the like on endpoints such as the client facilities 144A-F (in general, the terms endpoint, client, and client facility are used interchangeably herein unless a different meaning is explicitly provided or otherwise clear from the context). The threat management facility 100 may also provide for the removal of applications that potentially interfere with the operation of the threat management facility 100, such as competitor products that provide overlapping or conflicting threat management functions.

Threat management against a quickly evolving malware environment may require timely updates, and thus an update management facility 120 may be provided by the threat management facility 100 to update malware definitions, remediation software, rules, definitions and so forth. In addition, the policy management facility 112 may require update management (e.g., as provided by the update facility 120 herein described). The update management for the security management facility 122 and policy management facility 112 may be provided directly by the threat management facility 100, such as by a hosted system or in conjunction with the administration facility 134. In embodiments, the threat management facility 100 may provide patch management, e.g., for operating systems, applications, system tools and the like.

The threat management facility 100 may provide controlled access to the enterprise facility 102. For instance, a manager of the enterprise facility 102 may want to restrict access to certain applications, networks, files, printers, servers, databases, or the like. In addition, the manager of the enterprise facility 102 may want to restrict user access based on certain criteria, such as the user's location, usage history, need to know, job position, connection type, time of day, method of authentication, client-system configuration, or the like. Network access rules may be developed for the enterprise facility 102, or pre-packaged by a supplier, and managed by the threat management facility 100 in conjunction with the administration facility 134.

A network access rules facility 124 may be responsible for determining if a client facility application should be granted access to a requested network location. The network location may be on the same network as the enterprise facility 102 or may be on another network such as the data network 154. In an embodiment, the network access rules facility 124 may verify access rights for client facilities from within the enterprise facility 102 or may verify access rights of computer facilities from external networks. When network access for a client facility is denied, the network access rules facility 124 may send a data file to the client facility containing related information. The data file may contain a number of commands, definitions, instructions, or the like to be parsed and acted upon through the remedial action facility 128, or the like.

The network access rules facility 124 may include databases such as a block list, a black list, an allowed list, a white list, an unacceptable network site database, an acceptable network site database, a network site reputation database, or the like of network access locations that may or may not be accessed by the client facility. The network access rules facility 124 may also or instead include rules, application logic or the like for controlling network access according to network policies and the like. The network access rule facility 124 may provide updated rules and policies to the enterprise facility 102.

The detection facility 130 may be used to monitor activity and stored files on computing facilities, such as on server facilities 142, desktop computers, laptop computers, other mobile computing devices, and the like. The detection facility 130 may monitor the enterprise facility 102 network or endpoint devices, such as by monitoring streaming data through the gateway, across the network, through routers and hubs, and the like.

When a threat or policy violation is detected, e.g., by the detection facility 130 or more generally, by the threat management facility 100, the threat management facility 100 may perform or initiate a remedial action from the remedial action facility 128. Remedial action may take a plurality of forms, such as terminating or modifying an ongoing process or interaction, sending a warning to a client or administration facility 134 of an ongoing process or interaction, executing a program or application to remediate against a threat or violation, recording interactions for subsequent evaluation, or the like. Remedial action may also or instead include modifications to network access rules in order to terminate or restrict network activity by affected devices. Remedial action may also or instead include deployment of remediation Remedial action may also or instead include a scan of affected software and/or endpoints. More generally any action or combination of actions suitable for managing or containing threats or potential threats may be used by the remedial action facility 128.

The testing facility 118 may allow the administration facility 134 to coordinate the testing of the security configurations of client facilities in the enterprise facility 102. For example, the administration facility 134 may send test files to a set of client facilities to test the security posture. After the test file has been transmitted, a recording facility may record the actions taken by each of the client facilities in reaction to the test file. The recording facility may aggregate testing information from the client facilities and report the testing information to the administration facility 134. The administration facility 134 in turn evaluate a level of preparedness of the client facilities based on the reported information. Where appropriate, remedial action may be initiated for any vulnerable or compromised client facilities as determined by the administration facility 134.

The threat management facility 100 may provide threat protection to the enterprise facility 102 including networked components such as client facility, server facility 142, administration facility 134, firewall 138, gateway, hubs and routers 148, threat management appliance 140 (which may be a stand-alone application or network device, or may be deployed within one or more of the firewalls, gateways, routers and so forth), desktop users, mobile users, and the like. A security agent located on each endpoint may also or instead provide threat protection to a user. The term endpoint, as used herein, may refer to a computer system that sources data, receives data, evaluates data, buffers data, or the like (such as a desktop computer, mobile device, server, or other computing device), a firewall as a data evaluation endpoint computer system, a laptop as a mobile endpoint computer, a personal digital assistant or tablet as a hand-held endpoint computer, a mobile phone as an endpoint computer, or the like. Thus, endpoints include the client facilities 144 and servers 142 described herein, as well as any other computing devices or the like coupled in a communicating relationship to the data network 154 and/or within the enterprise facility 102. The term endpoint may also or instead refer to a source or destination for data.

The enterprise facility 102 may include a plurality of servers 142, such as application servers, communications servers, file servers, database servers, proxy servers, mail servers, fax servers, game servers, web servers, and the like. A server 142 may include any machine or application that accepts client facility connections in order to service requests from clients 144. In one aspect, the server 142 may run on the same computer as a client facility 144 using it, or the server 142 and the client facility 144 may be running on different computers and communicating across the network. A server facility 142 may also be an appliance facility 140, where the appliance facility 140 provides specific services onto the network.

A client facility may be protected from threats from within the enterprise facility 102 using a personal firewall, which may be a hardware firewall, software firewall, or combination of these, that controls network traffic to and from a client. The personal firewall may permit or deny communications based on a security policy. Personal firewalls may be designed for use by end-users, which may result in protection for only the computer on which it's installed.

Another component that may be protected by an endpoint computer security facility 152 is a network firewall facility 138, which may be a hardware or software device that may be configured to permit, deny, or proxy data through a computer network that has different levels of trust in its source of data. For instance, an internal enterprise facility 102 network may have a high level of trust, because the source of all data has been sourced from within the enterprise facility 102. An example of a source with a low level of trust is a data network 154 that includes a public network such as the Internet, and more particularly, unknown sources of data on the Internet. A perimeter network forms a zone with an intermediate trust level situated between the Internet and a trusted internal network. Since firewall facilities 138 may represent boundaries between threat levels (corresponding to boundaries between different networks), the security agent 152 associated with the firewall facility 138 may provide resources that control the flow of threats at this enterprise facility 102 network entry point. Firewall facilities 138, and associated security agents 152, may also be associated with a network node that is equipped for interfacing between networks that use different protocols. In embodiments, a security agent 152 may provide threat protection in a plurality of network infrastructure locations, such as at the enterprise facility 102 network entry point, i.e. the firewall facility 138 or gateway; at the server facility 142; at distribution points within the network, i.e. the hubs and routers 148; at the desktop of client facility computers; and the like. In embodiments, the most effective location for threat detection may be at the user's computer desktop security agent 152.

Client facilities within the enterprise facility 102 or outside the enterprise facility 102 may be connected to the enterprise facility 102 network by way of wired network facilities 148A or wireless network facilities 148B, or any combination of these. Within areas exposed to secondary location threats 108, there may be no security agents 152 at network components such as firewalls 138B, servers 142B, clients 144G, hubs and routers 148C-D, and the like. As a result, the computer components at such locations may be open to threat attacks, and become potential sources of threats. In this instance, these computer components may now unknowingly spread a threat to other components connected to the network, and it may be useful to track transitions into and of these secondary locations by devices associated with the enterprise facility 102 but connected to other network resources outside the enterprise facility 102.

Having provided an overall context for threat detection, the description now turns to a brief discussion of an example of a computer system that may be used for any of the entities and facilities described above.

Figure 2:
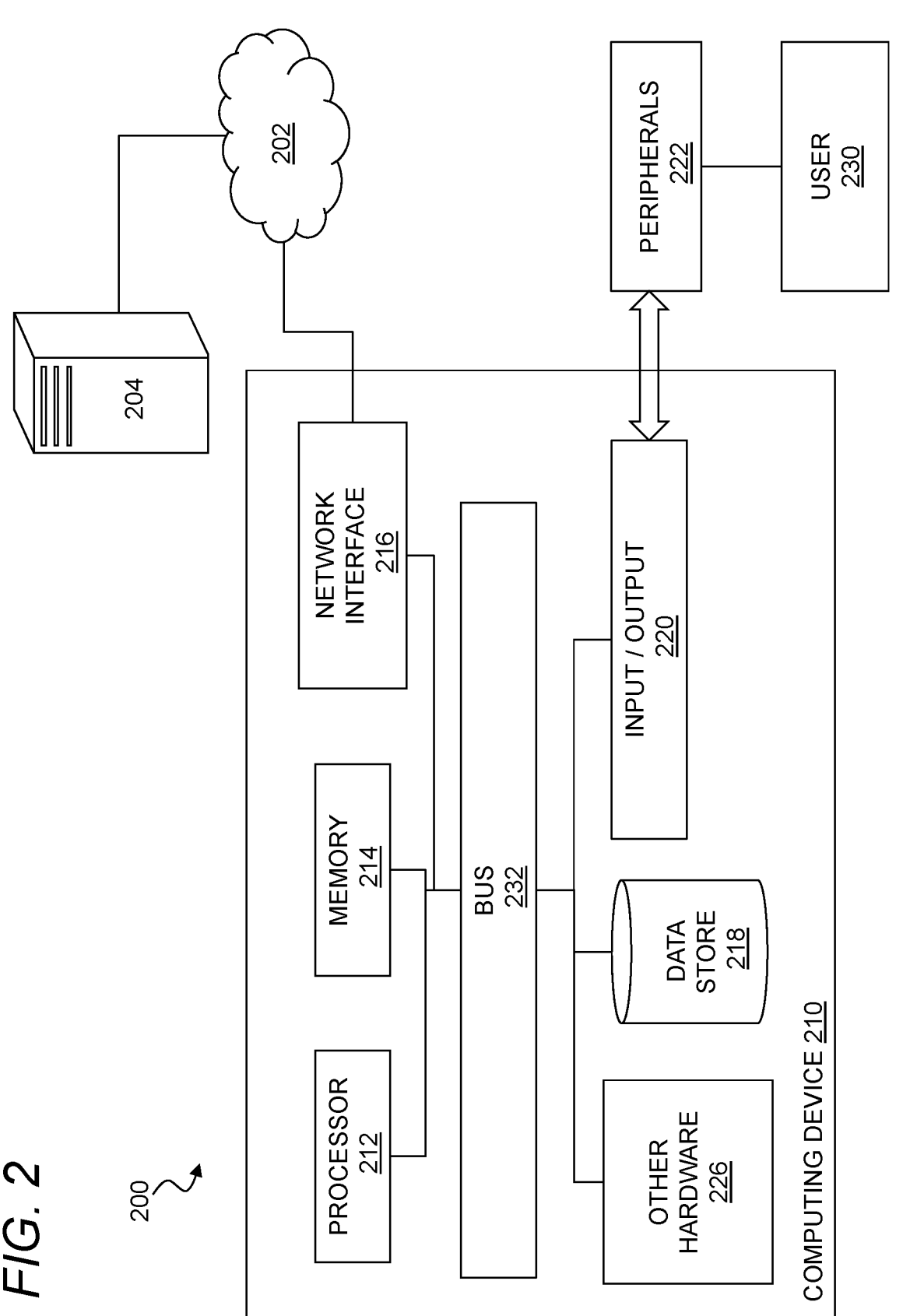
FIG. 2 illustrates a computer system.

FIG. 2 illustrates a computer system. In general, the computer system 200 may include a computing device 210 connected to a network 202, e.g., through an external device 204. The computing device 210 may be or include any type of network endpoint or endpoints as described herein, e.g., with reference to FIG. 1 above. For example, the computing device 210 may include a desktop computer workstation. The computing device 210 may also or instead be any suitable device that has processes and communicates over a network 202, including without limitation a laptop computer, a desktop computer, a personal digital assistant, a tablet, a mobile phone, a television, a set top box, a wearable computer (e.g., watch, jewelry, or clothing), a home device (e.g., a thermostat or a home appliance controller), just as some examples. The computing device 210 may also or instead include a server, or it may be disposed on a server.

The computing device 210 may provide a physical or virtual device as a platform for any of the entities described in the threat management environment above with reference to FIG. 1. For example, the computing device 210 may be a server, a client, a threat management facility, or any of the other facilities or computing devices described therein. In certain aspects, the computing device 210 may be implemented using hardware (e.g., in a desktop computer), software (e.g., in a virtual machine or the like), or a combination of software and hardware (e.g., with programs executing on the desktop computer). The computing device 210 may be a standalone device, a device integrated into another entity or device, a platform distributed across multiple entities, or a virtualized device executing in a virtualization environment.

The network 202 may include the network 105 described above, which may be any data network(s) or internetwork(s) suitable for communicating data and control information among participants in the computer system 200. This may include public networks such as the Internet, private networks, and telecommunications networks such as the Public Switched Telephone Network or cellular networks using third generation cellular technology (e.g., 3G or IMT-2000), fourth generation cellular technology (e.g., 4G, LTE. MT-Advanced, E-UTRA, etc.), fifth generation cellular technology (e.g., 5G), WiMax-Advanced (IEEE 802.16m)) and/or other technologies, as well as any of a variety of corporate area, metropolitan area, campus or other local area networks or enterprise networks, along with any switches, routers, hubs, gateways, and the like that might be used to carry data among participants in the computer system 200. The network 202 may also include a combination of data networks, and need not be limited to a strictly public or private network.

The external device 204 may be any computer or other remote resource that connects to the computing device 210 through the network 202. This may include threat management resources such as any of those contemplated above, gateways or other network devices, remote servers or the like containing content requested by the computing device 210, a network storage device or resource, a device hosting malicious content, or any other resource or device that might connect to the computing device 210 through the network 202.

The computing device 210 may include a processor 212, a memory 214, a network interface 216, a data store 218, and one or more input/output devices 220. The computing device 210 may further include or be in communication with peripherals 222 and other external input/output devices 224.

The processor 212 may be any as described herein, and may generally be capable of processing instructions for execution within the computing device 210 or computer system 200. The processor 212 may include a single-threaded processor or a multi-threaded processor. The processor 212 may be capable of processing instructions stored in the memory 214 or on the data store 218.

The memory 214 may store information within the computing device 210 or computer system 200. The memory 214 may include any volatile or non-volatile memory or other computer-readable medium, including without limitation a Random-Access Memory (RAM), a flash memory, a Read Only Memory (ROM), a Programmable Read-only Memory (PROM), an Erasable PROM (EPROM), registers, and so forth. The memory 214 may store program instructions, program data, executables, and other software and data useful for controlling operation of the computing device 200 and configuring the computing device 200 to perform functions for a user. The memory 214 may include a number of different stages and types for different aspects of operation of the computing device 210. For example, a processor may include on-board memory and/or cache for faster access to certain data or instructions, and a separate, main memory or the like may be included to expand memory capacity as desired.

The memory 214 may, in general, include a non-volatile computer readable medium containing computer code that, when executed by the computing device 200 creates an execution environment for a computer program in question, e.g., code that constitutes processor firmware, a protocol stack, a database management system, an operating system, or a combination of the foregoing, and/or code that performs some or all of the steps set forth in the various flow charts and other algorithmic descriptions set forth herein. While a single memory 214 is depicted, it will be understood that any number of memories may be usefully incorporated into the computing device 210. For example, a first memory may provide non-volatile storage such as a disk drive for permanent or long-term storage of files and code even when the computing device 210 is powered down. A second memory such as a random-access memory may provide volatile (but higher speed) memory for storing instructions and data for executing processes. A third memory may be used to improve performance by providing even higher speed memory physically adjacent to the processor 212 for registers, caching and so forth.

The network interface 216 may include any hardware and/or software for connecting the computing device 210 in a communicating relationship with other resources through the network 202. This may include remote resources accessible through the Internet, as well as local resources available using short range communications protocols using, e.g., physical connections (e.g., Ethernet), radio frequency communications (e.g., WiFi), optical communications, (e.g., fiber optics, infrared, or the like), ultrasonic communications, or any combination of these or communications through any other media that might be used to carry data between the computing device 210 and other devices. The network interface 216 may, for example, include a router, a modem, a network card, an infrared transceiver, a radio frequency (RF) transceiver, a near field communications interface, a radio-frequency identification (RFID) tag reader, or any other data reading or writing resource or the like.

More generally, the network interface 216 may include any combination of hardware and software suitable for coupling the components of the computing device 210 to other computing or communications resources. By way of example and not limitation, this may include electronics for a wired or wireless Ethernet connection operating according to the IEEE 802.11 standard (or any variation thereof), or any other short or long range wireless networking components or the like. This may include hardware for short range data communications such as Bluetooth or an infrared transceiver, which may be used to couple to other local devices, or to connect to a local area network or the like that is in turn coupled to a data network 202 such as the Internet. This may also or instead include hardware/software for a WiMax connection or a cellular network connection (using, e.g., CDMA, GSM, LTE, 5G, or any other suitable protocol or combination of protocols). The network interface 216 may be included as part of the input/output devices 220 or vice-versa.

The data store 218 may be any internal memory store providing a computer-readable medium such as a disk drive, an optical drive, a magnetic drive, a flash drive, or other device capable of providing mass storage for the computing device 210. The data store 218 may store computer readable instructions, data structures, program modules, and other data for the computing device 210 or computer system 200 in a non-volatile form for subsequent retrieval and use. For example, the data store 218 may store the operating system, application programs, program data, databases, files, and other program modules or other software objects and the like.

The input/output interface 220 may support input from and output to other devices that might couple to the computing device 210. This may, for example, include serial ports (e.g., RS-232 ports), universal serial bus (USB) ports, optical ports, Ethernet ports, telephone ports, audio jacks, component audio/video inputs, HDMI ports, and so forth, any of which might be used to form wired connections to other local devices. This may also or instead include an infrared interface, RF interface, magnetic card reader, or other input/output system for coupling in a communicating relationship with other local devices. It will be understood that, while the network interface 216 for network communications is described separately from the input/output interface 220 for local device communications, these two interfaces may be the same, or may share functionality, such as where a USB port is used to attach to a WiFi accessory, or where an Ethernet connection is used to couple to a local network attached storage.

The computer system 200 may include a peripheral 222 for the computing device 210 such as any device used to provide information to or receive information from the computing device 200. This may include human input/output (I/O) devices such as a keyboard, a mouse, a mouse pad, a track ball, a joystick, a microphone, a foot pedal, a camera, a touch screen, a scanner, or other device that might be employed by the user 230 to provide input to the computing device 210. This may also or instead include a display, a speaker, a printer, a projector, a headset or any other audiovisual device for presenting information to a user. The peripheral 222 may also or instead include a digital signal processing device, an actuator, or other device to support control of or communications with other devices or components. Other I/O devices suitable for use as a peripheral 222 include haptic devices, three-dimensional rendering systems, augmented-reality displays, magnetic card readers, and so forth. In one aspect, the peripheral 222 may serve as the network interface 216, such as with a USB device configured to provide communications via short range (e.g., Bluetooth, WiFi, Infrared, RF, or the like) or long range (e.g., cellular data or WiMax) communications protocols. In another aspect, the peripheral 222 may provide a device to augment operation of the computing device 210, such as a global positioning system (GPS) device, a security dongle, or the like. In another aspect, the peripheral may be a storage device such as a flash card, USB drive, or other solid-state device, or an optical drive, a magnetic drive, a disk drive, or other device or combination of devices suitable for bulk storage. More generally, any device or combination of devices suitable for use with the computing device 200 may be used as a peripheral 222 as contemplated herein.

Other hardware 226 may be incorporated into the computing device 200 such as a co-processor, a digital signal processing system, a math co-processor, a graphics engine, a video driver, and so forth. The other hardware 226 may also or instead include expanded input/output ports, extra memory, additional drives (e.g., a DVD drive or other accessory), and so forth.

A bus 232 or combination of busses may serve as an electromechanical platform for interconnecting components of the computing device 200 such as the processor 212, memory 214, network interface 216, other hardware 226, data store 218, and input/output interface. As shown in the figure, each of the components of the computing device 210 may be interconnected using a system bus 232 or other communication mechanism for communicating information.

Methods and systems described herein can be realized using the processor 212 of the computer system 200 to execute one or more sequences of instructions contained in the memory 214 to perform predetermined tasks. In embodiments, the computing device 200 may be deployed as a number of parallel processors synchronized to execute code together for improved performance, or the computing device 200 may be realized in a virtualized environment where software on a hypervisor or other virtualization management facility emulates components of the computing device 200 as appropriate to reproduce some or all of the functions of a hardware instantiation of the computing device 200.

Figure 3:
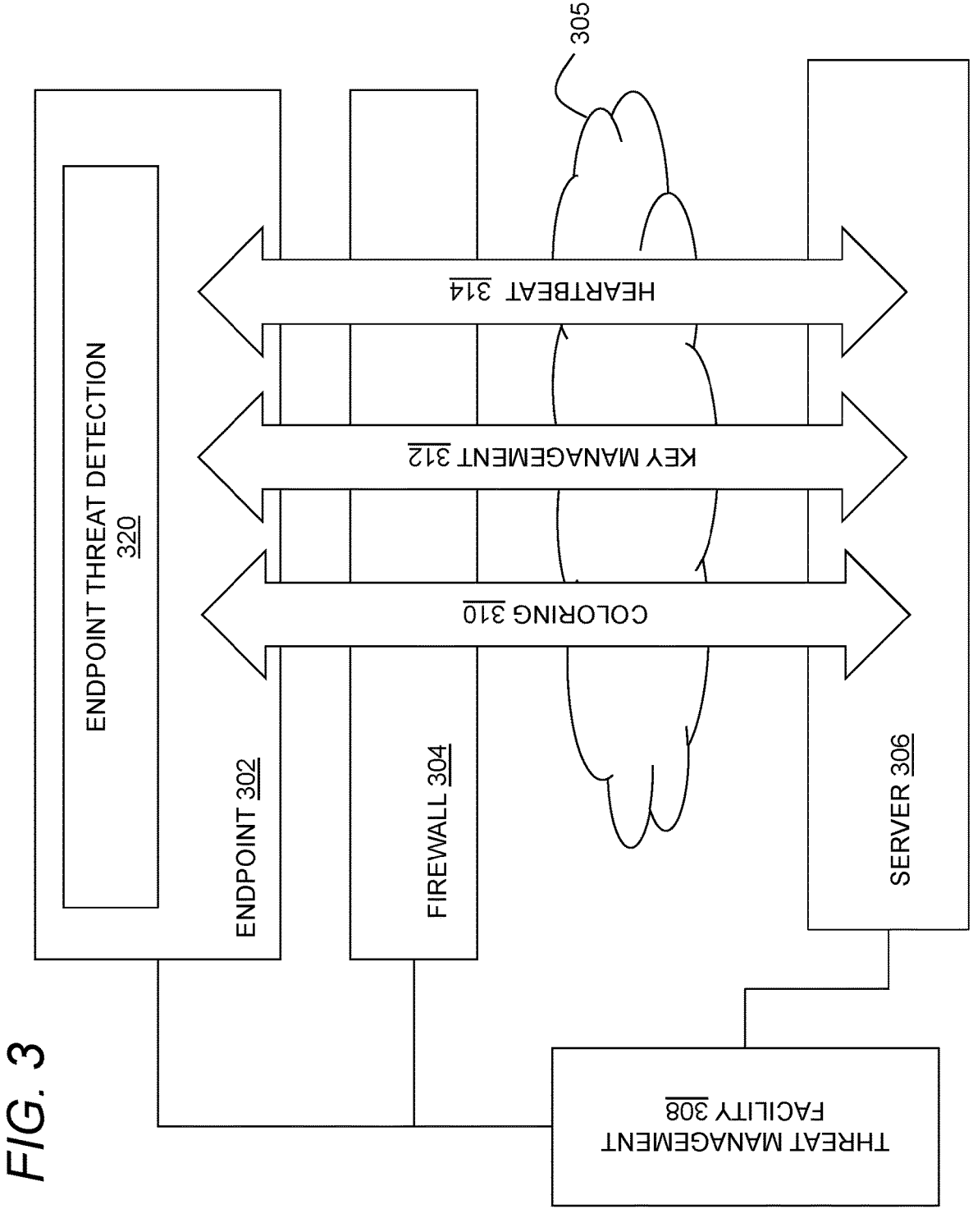
FIG. 3 illustrates a threat management system.

FIG. 3 illustrates a threat management system as contemplated herein. In general, the system may include an endpoint 302, a firewall 304, a server 306 and a threat management facility 308 coupled to one another directly or indirectly through a data network 305, all as generally described above. Each of the entities depicted in FIG. 3 may, for example, be implemented on one or more computing devices such as the computing device described above with reference to FIG. 2. A number of systems may be distributed across these various components to support threat detection, such as a coloring system 310, a key management system 312 and a heartbeat system 314, each of which may include software components executing on any of the foregoing system components, and each of which may communicate with the threat management facility 308 and an endpoint threat detection agent 320 executing on the endpoint 302 to support improved threat detection and remediation.

The coloring system 310 may be used to label or 'color' software objects for improved tracking and detection of potentially harmful activity. The coloring system 310 may, for example, label files, executables, processes, network communications, data sources and so forth with any suitable. A variety of techniques may be used to select static and/or dynamic labels for any of these various software objects, and to manage the mechanics of applying and propagating coloring information as appropriate. For example, a process may inherit a color from an application that launches the process. Similarly, a file may inherit a color from a process when it is created or opened by a process, and/or a process may inherit a color from a file that the process has opened. More generally, any type of labeling, as well as rules for propagating, inheriting, changing, or otherwise manipulating such labels, may be used by the coloring system 310 as contemplated herein.

The key management system 312 may support management of keys for the endpoint 302 to selectively permit or prevent access to content on the endpoint 302 on a file-specific basis, a process-specific basis, an application-specific basis, a user-specific basis, or any other suitable basis to prevent data leakage, and to support more fine-grained and immediate control over access to content on the endpoint 302 when a security compromise is detected. Thus, for example, if a particular process executing on the endpoint is compromised, or potentially compromised or otherwise under suspicion, keys to that process may be revoked to prevent, e.g., data leakage or other malicious activity.

The heartbeat system 314 may be used to provide periodic or aperiodic information from the endpoint 302 or other system components about system health, security, status, and so forth. A heartbeat may be encrypted or plaintext, or some combination of these, and may be communicated unidirectionally (e.g., from the endpoint 302 to the threat management facility 308) or bidirectionally (e.g., between the endpoint 302 and the server 306, or any other pair of system components) on any useful schedule. A suitable heartbeat system is described in greater detail below with reference to FIG. 4.

In general, these various monitoring and management systems may cooperate to provide improved threat detection and response. For example, the coloring system 310 may be used to evaluate when a particular process is potentially opening inappropriate files, and a potential threat may be confirmed based on an interrupted heartbeat from the heartbeat system 314. The key management system 312 may then be deployed to revoke keys to the process so that no further files can be opened, deleted or otherwise modified. More generally, the cooperation of these systems enables a wide variety of reactive measures that can improve detection and remediation of potential threats to an endpoint.

Figure 4:
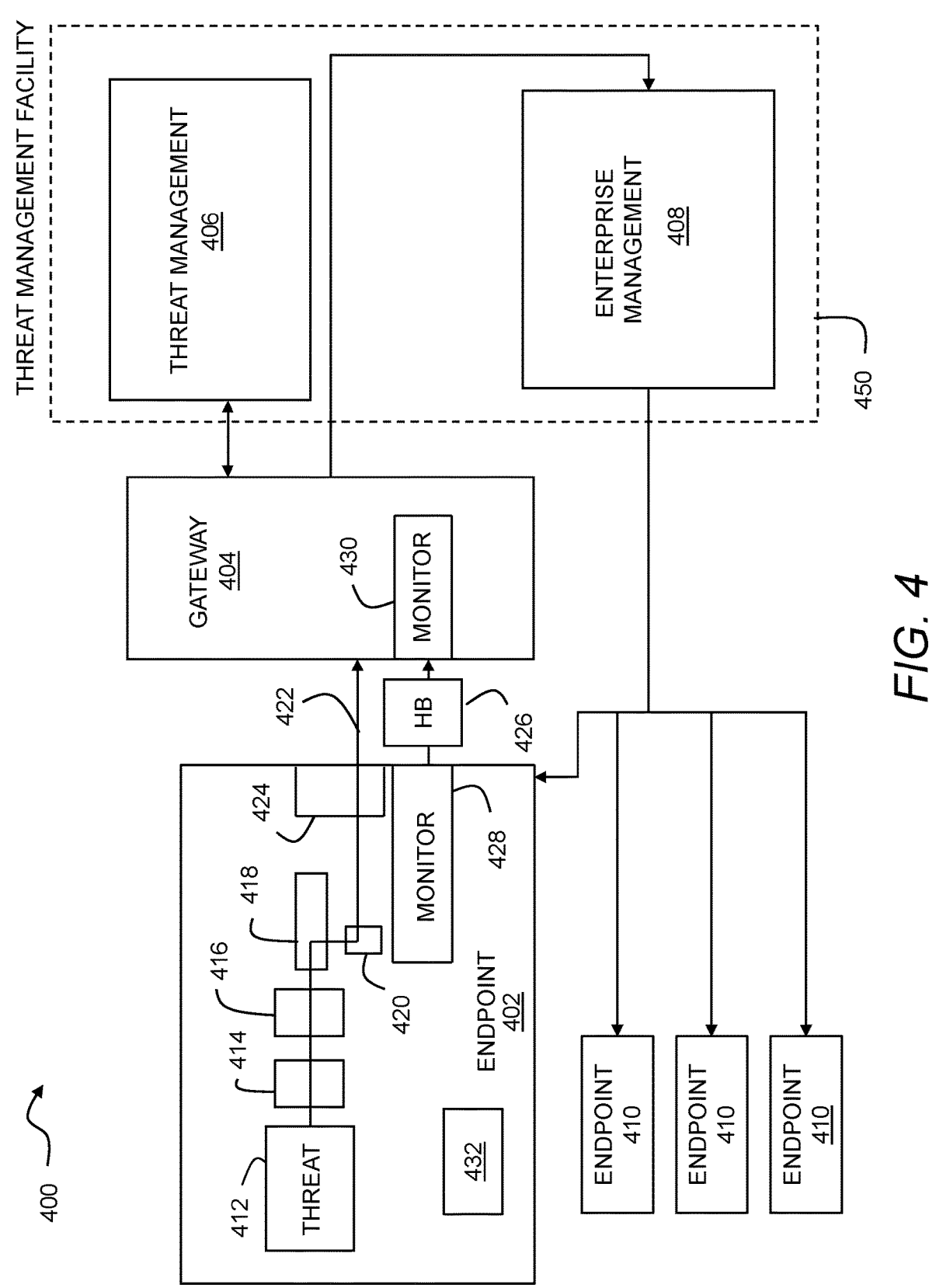
FIG. 4 illustrates a threat management system using heartbeats.

FIG. 4 illustrates a threat management system using heartbeats. In general, a system 400 may include an endpoint 402, a gateway 404, a threat management system 406, and an enterprise management system 408 that manages an enterprise including the endpoint 402, the gateway 404, and one or more additional endpoints 410. Each of these components may be configured with suitable programming to participate in the detection and remediation of an advanced persistent threat (APT) or other malware threat as contemplated herein.

The endpoint 402 may be any of the endpoints described herein, or any other device or network asset that might join or participate in an enterprise network. The endpoint 402 may contain a threat 412 such as an advanced persistent threat, virus, or similar malware that resides on the endpoint 402. The threat 412 may have reached the endpoint 402 in a variety of ways, and may have been placed manually or automatically on the endpoint 402 by a malicious source. It will be understood that the threat 412 may take any number of forms and have any number of components. For example, the threat 412 may include an executable file that can execute independently, or the threat 412 may be a macro, plug-in, or the like that executes within another application. Similarly, the threat 412 may manifest as one or more processes or threads executing on the endpoint 402. The threat 412 may install from a file on the endpoint 402 or a file remote from the endpoint 402, and the threat 412 may create one or more other files such as data files or the like while executing. Advanced persistent threats can be particularly difficult to detect and remediate, and the systems and methods contemplated herein can advantageously provide improved sensitivity to such threats, as well as enabling improved remediation strategies. However, the systems and methods contemplated herein may also or instead be used to detect and remediate other types of malware threats. As such, in this context references to a particular type of threat (e.g., an advanced persistent threat) should be understood to generally include any type of malware or other threat to an endpoint or enterprise unless a more specific threat or threat type is explicitly provided or otherwise clear from the context.

The threat 412 may be analyzed by one or more threat countermeasures on the endpoint 402 such as a whitelisting filter 414 that approves each item of code before executing on the endpoint 402 and prevents execution of non-whitelisted code. The endpoint 402 may also include an antivirus engine 416 or other malware detection software that uses any of a variety of techniques to identify malicious code by reputation or other characteristics. A runtime detection engine 418 may also monitor executing code to identify possible threats. More generally, any of a variety of threat detection techniques may be applied to the threat 412 before and during execution. In general, a threat 412 may evade these and other security measures and begin executing as a process 420 on the endpoint 402.

Network traffic 422 from the process 420 may be monitored and logged by a traffic monitor 424 on the endpoint 402. The traffic monitor 424 may, for example, logs a time and a source of each network request from the endpoint 402. Where the endpoint 402 is within an enterprise network, the network traffic 422 may pass through the gateway 404 in transit to a data network such as the Internet. While the gateway 404 may be logically or physically positioned between the endpoint 402 and an external data network, it will be understood that other configurations are possible. For example, where the endpoint 402 is associated with an enterprise network but operating remotely, the endpoint 402 may form a VPN or other secure tunnel or the like to the gateway 404 for use of a threat management system 406, enterprise management system 408, and any other enterprise resources.

The endpoint 402 may use a heartbeat 426 to periodically and securely communicate status to the gateway 404. The heartbeat 426 may be created by a health monitor 428 within the endpoint 402, and may be transmitted to a remote health monitor 430 at the gateway 404. The health monitor 428 may monitor system health in a variety of ways, such as by checking the status of individual software items executing on the endpoint 402, checking that antivirus and other security software is up to date (e.g., with current virus definition files and so forth) and running correctly, checking the integrity of cryptographic key stores, checking for compliance with enterprise security policies, and checking any other hardware or software components of the endpoint 402 as necessary or helpful for health monitoring. The health monitor 428 may thus condition the issuance of a heartbeat 426 on a satisfactory status of the endpoint 402 according to any suitable criteria, enterprise policies, and other evaluation techniques.

The heartbeat 426 may be secured in any suitable manner so that the remote health monitor 430 can reliably confirm the source of the heartbeat 426 and the status of the endpoint 402. To this end, the heartbeat 426 may be cryptographically signed or secured using a private key so that the remote health monitor 430 can authenticate the origin of the heartbeat 426 using a corresponding public key. In one aspect, the heartbeat 426 may include a combination of plaintext information and encrypted information, such as where the status information for the endpoint is provided in plaintext while a digital signature for authentication is cryptographically secured. In another aspect, all of the information in the heartbeat 426 may be encrypted.

In one aspect, a key vault 432 may be provided on the endpoint to support cryptographic functions associated with a secure heartbeat. An obfuscated key vault 432 may support numerous useful functions, including without limitation, private key decryption, asymmetric signing, and validation with a chain of trust to a specific root validation certificate. A variety of suitable key management and cryptographic systems are known in the art and may be usefully employed to a support the use of a secure heartbeat as contemplated herein. The system may support a secure heartbeat in numerous ways. For example, the system may ensure that signing and decryption keys can only be used in authorized ways and inside an intended Access Control mechanism. The system may use "anti-lifting" techniques to ensure that a signing key can only be used when the endpoint is healthy. The system may ensure that attacking software cannot, without first reverse-engineering the key vault 432, extract the original key material. The system may also usefully ensure that an attacker cannot undetectably replace the public keys in a root certificate store, either directly or indirectly, such as in an attack that tries to cause the code to validate against a different set of root keys without directly replacing any keys in the root store.

Robustness of the heartbeat 426 may usefully provide defensive mechanisms against reverse engineering of obfuscated content (e.g., the private key material stored in key vault 432, the code used to validate the correct running of the remainder of the systems as part of the heartbeat 426 code itself) and any anti-lifting protections to prevent malware from directly using the endpoint 402 (or the health monitor 428 on the endpoint 402) to continue to send out signed heartbeat packets (e.g. stating that "all is well" with the endpoint) after security mechanisms have been impaired, disabled, or otherwise compromised in any way. Lifting in this manner by malicious code can be materially mitigated by providing statistical validation (e.g., with checksums of code) of call stacks, calling processes, and core processes. Likewise, statistical checks as well as checksum integrations into the cryptographic calculations may protect against code changes in the heartbeat 426 code itself.

A variety of useful techniques may be employed to improve security of the key vault 432 and the heartbeat 426. For example, the system may use domain shifting so that original key material is inferred based on hardware and software properties readily available to the key vault 432, and to ensure that key material uses non-standard algorithms. Software properties may, for example, include readily determined system values such as hashes of nearby code. In another aspect, the keys may be domain shifted in a manner unique to the endpoint 402 so that the manner of statistical validation of call stacks and core software is unique to the endpoint 402. Further the key vault may be provisioned so that a public key stored in the key vault 432 is signed with a certificate (or into a certificate chain) that can be externally validated by a network appliance or other trusted third party or directly by the health monitor.

The heartbeat 426 may encode any useful status information, and may be transmitted from the endpoint 402 on any desired schedule including any periodic, aperiodic, random, deterministic, or other schedule. Configured in this manner, the heartbeat 426 can provide secure, tamper-resistant instrumentation for status of the endpoint 402, and in particular an indication that the endpoint 402 is online and uncompromised. A disappearance of the heartbeat 426 from the endpoint 402 may indicate that the endpoint 402 has been compromised; however, this may also simply indicate that the endpoint 402 has been powered off or intentionally disconnected from the network. Thus, other criteria may be used in addition to the disappearance or interruption of the heartbeat 426 to more accurately detect malicious software. Some such techniques are described below, but it will be understood that this may include any supplemental information that might tend to make an attack on the endpoint 402 more or less likely. For example, if the heartbeat 426 is interrupted but the endpoint 402 is still sourcing network traffic, then an inference might suitably be made that the endpoint 402 is compromised.

The threat management system 406 may, in general, be any of the threat management systems described herein. The enterprise management system 408 generally provides tools and interfaces for administration of the enterprise and the one or more additional endpoints 410 and other resources or assets attached thereto. It will be understood that, the functions of the threat management system 406 and the enterprise management system 408 may vary, and general threat management and administration functions may be distributed in a variety of ways between and among these and other components. This is generally indicated in FIG. 4 as a threat management facility 450 that includes the threat management system 406 and the enterprise management system 408. It will be understood that either or both of these systems may be administered by third parties on behalf of the enterprise, or managed completely within the enterprise, or some combination of these, all without departing from the scope of this disclosure. It will similarly be understood that a reference herein to a threat management facility 450 is not intended to imply any particular combination of functions or components, and shall only be understood to include such functions or components as explicitly stated in a particular context, or as necessary to provide countermeasures for advanced persistent threats as contemplated herein.

Figure 5:
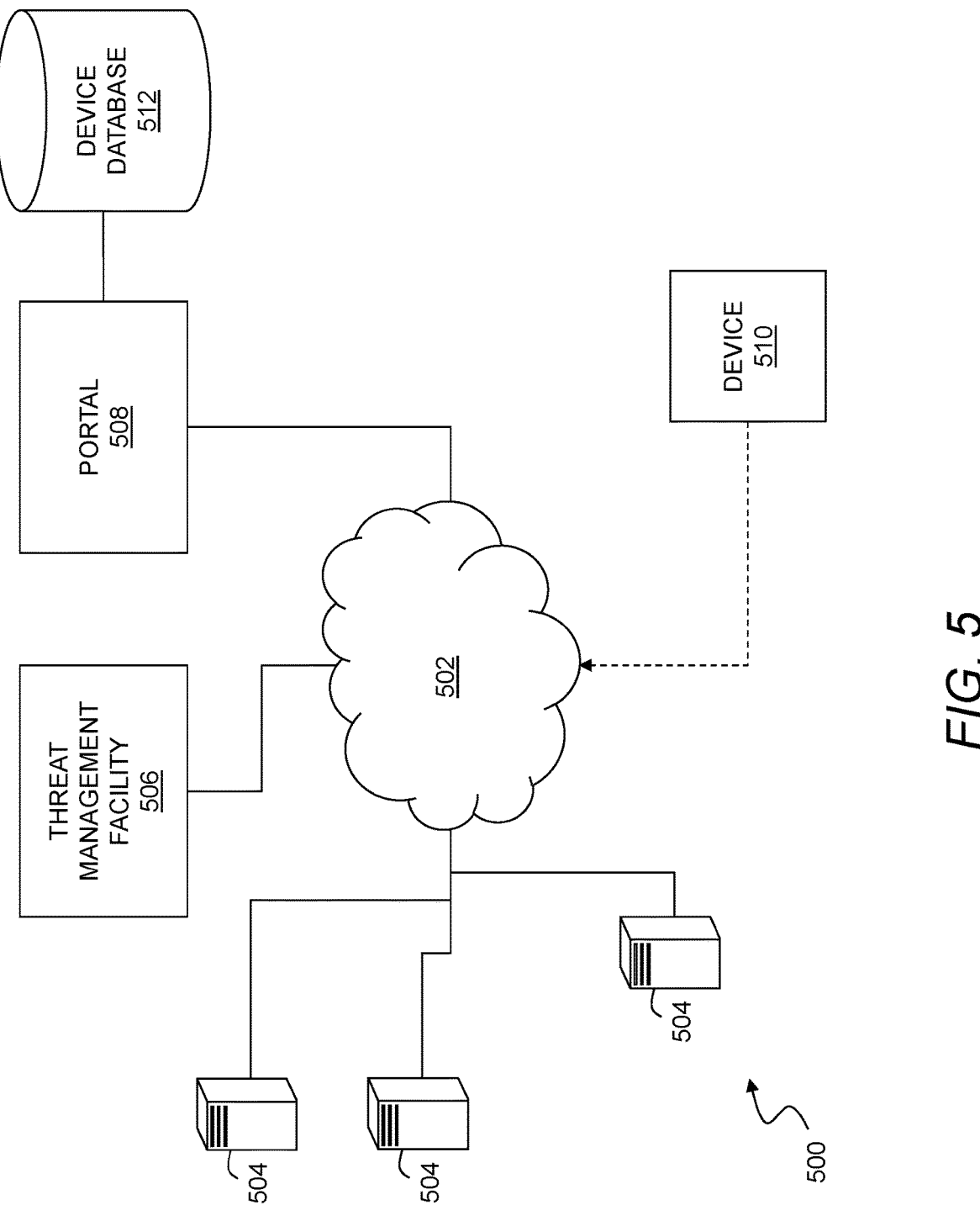
FIG. 5 illustrates a system with a new device joining a network.

FIG. 5 illustrates a system 500 with a new device (e.g., endpoints 504, device 510) joining a network 502 (e.g., an enterprise network). The system 500 may include a network 502 such as any of the enterprise networks described herein, or any other data network, combination of data networks or the like coupling the endpoints 504 such as any of the endpoints 504 described herein in, which are shown in a communicating relationship with one another. The system 500 may also include a threat management facility 506 such as any of the threat management facilities described herein to administer enterprise network policies and manage network security for devices such as the endpoints 504 within the network 502. Although not depicted in FIG. 5, it will be appreciated that the network 502 may also include any number of additional network devices, hardware, virtual machines, servers, routers, gateways, wireless and wired networks, virtual private network (VPN) connections, and so forth.

The system 500 may include a portal 508 for managing entry of new devices onto the network 502. When a new device such as the device 510 connects to the network 502, e.g., by connecting to a router physically through an Ethernet port or by connecting wirelessly to a wireless access point or other wireless air interface, the device 510 may be directed to the portal 508 to manage whether and how the device 510 is permitted to use the network 502 and network resources. For example, network requests from the device 510 may be directed to the portal 508. This may, for example, be accomplished through an HTTP redirect or other suitable technique for handling HTTP connections within the network 502.

The portal 508 may receive network requests from new devices and provide entry management capability. It will be appreciated that while the portal 508 is depicted as a separate entity, the portal 508 may be implemented within the threat management facility 506 or any other network device such as a switch, router, gateway, firewall, wireless access point, or other device associated with the network 502. In some cases, the portal 508 may be interposed between the system 500 and the Internet. In some cases, the portal 508 may be in communication with devices that are interposed between the system 500 and the Internet, such as a gateway or firewall, allowing for observation or interception of network traffic to or from the device 510. The portal 508 may recognize new devices using any suitable techniques including, without limitation, by maintaining a table of known devices and corresponding identifiers or by using a MAC address, DUID, or other machine identifier. In another aspect, the portal 508 may receive a heartbeat (or, if the device 510 does not initially offer a heartbeat, the portal 508 may explicitly request a heartbeat) that may be digitally signed or otherwise cryptographically secured in a manner that permits authentication of the identity of the device 510, e.g., with reference to an external trust authority. The portal 508 may request heartbeat information associated with the device 510 from another network device, such as a gateway, the threat management facility 506, or one or more of the endpoints 504 that may have access to heartbeat information from the device 510. The heartbeat information may indicate the status of the device 510 whether the device currently is being managed and with respect to the status and capabilities of the device.

Where the device 510 does not initially provide identifying information, the portal 508 may attempt to identify the device 510 using any suitable techniques. This may include active techniques, passive techniques, or any combination of these.

For example, active techniques may include any techniques actively managed by the portal 508 (and/or threat management facility 506) for querying or interacting with the device 510. In one aspect, for a device that has a user interface, the portal 508 may present a web page to the device 510 that interactively guides a user of the device 510 through a network entry procedure. Thus, the portal 508 may include a web portal or other server, content or the like for interactively identifying the device 510 in a user-guided process. For example, the web page may request credentials that identify the device 510, or a user of the device 510, as an authorized or recognized network participant. Where the device or user is unrecognized, the web page may guide a user through a registration process that gathers sufficient information to identify the user going forward, and/or that brings the device 510 into compliance with a network security policy for an enterprise network, e.g., by checking for the presence of security software, installing a local security agent, checking for software versions and updates, scanning for viruses and so forth. The portal 508 may also or instead provide a cookie or other identifiable file or data object to the device 510 that the device 510 can later use to identify itself on the network 502.

Active techniques also may include any techniques actively managed by the device 510. For example, the device 510 may initiate communications on the network by generating and communicating a secure heartbeat, or by launching a local security agent that handshakes with the portal 508 or threat management facility 506. As noted above, various active techniques may also be used in combination. For example, the device 510 may initiate communications on the network 502 by communicating data packets through a wireless access point or the like. When the device 510 is directed to the portal 508 as a new device, the portal 508 may initially attempt to programmatically verify the identity of the device 510, e.g., by attempting to query a local security agent on the device 510. If this is successful, the local security agent may respond to the query from the portal 508 by generating and responding with a secure heartbeat that can be used by the portal 508 to verify the identity of the device 510. More generally, any techniques by which the portal 508 and the device 510 can cooperate to identify reliably the device 510 and/or to admit the device 510 onto the network 502 may be used to control access to the network 502 as contemplated herein.

Active techniques also may include actively testing the response of the device 510 to network requests. For example, if the device 510 provides a web server, the web server on the device 510 may be queried for information. A management page of the device 510, for example, may provide information about the type of the device 510, a configuration of the device 510, an identifier for the device 510 (e.g., serial number), and so forth. For example, if the device 510 responds to Simple Network Management Protocol (SNMP) requests, the response of the device 510 to SNMP requests may be determined, potentially providing information about the type of the device 510, the configuration of the device 510, an identifier for the device 510, and so forth. Likewise, for any other protocol, whether common (e.g., telnet, ftp, ssh, sftp, ntp, dns, smb, etc.) or device-specific (e.g., remote control protocol specific to a brand of television, in instances in which such a protocol is applicable) a network request made to the device 510 may provide information about the device 510, and so an opportunity to determine the type of device 510 and/or the status of the device 510. For example, if the device 510 provides a capability to communicate via ssh, the ssh protocol may include the device 510 providing a key that is relatively unique to the device 510. Network requests may be originated by the portal 508 or the portal 508 may request that another device (e.g., firewall, gateway, one or more of the endpoints 504, the threat management facility 506) initiate one or more network requests, and the response(s) provided to the portal 508. For example, if the device makes a web request, a response to the web request may be intercepted, and detection code (e.g., a snippet, cookie, etc.) may be injected into the response. In some cases, a scan of network ports may be undertaken. In some cases, certain port(s) may be tested with initial request(s), and other request(s) may be initiated based on the results from the initial requests, for example as determined by information in the database 512 of the device 510.

Passive techniques may also or instead be used to identify the device 510 in a manner sufficiently reliable for admission onto the network 502. This may include, for example, various techniques for fingerprinting or otherwise identifying the device 510 based on what the device 510 reports about itself including but not limited to network traffic, packet header information, status reports or other information that can be obtained from communications by the device 510 or among the device 510 and other devices on the network 502. For example, the portal 508 may analyze network traffic to or from the device 510. The portal 508 may also or instead analyze network information for the device 510 such as the MAC address, a machine name or identifier, an IP address, a default gateway address, DNS servers and so forth. The portal 508 may also or instead analyze information in network packet headers such as a source IP address, a destination IP address, a source port number, a destination port number, and an IP protocol number. The portal 508 may also or instead analyze DHCP or DNS requests made by the device. Devices may include an identifier, such as a MAC address or an IPv6 DHCP Unique Identifier (DUID).

The portal 508 may also or instead observe an authentication by the device 510 to a server within the system 500 or outside of the system 500. This may include observing the network address of the server. This may include observing HTTP or HTTPS requests made by the device 510. This may include HTTP Strict Transport Security (HSTS) pinning. This may include observing the communication of authentication credentials provided by the device 510. This may include observing the results of authentication, for example, whether authentication was successful, by observing the traffic communicated following the authentication. This may include interposing a gateway in between (i.e., a man-in-the-middle between) the device 510 and a server when the device 510 engages in an encrypted protocol to observe encrypted communication between the device 510 and a server.

The portal 508 may store a database 512 of devices that are known to the network 502 or threat management facility 506, such as devices that have been previously authorized to use the network 502 by a network administrator, or devices that have been admitted by the portal 508 using, e.g., the techniques described herein. When a new device such as the device 510 appears on the network 502, the device 510 may be redirected to the portal 508 where the portal 508 may initially compare the device 510 to the list of devices stored in the database 512 and make a preliminary decision whether to admit the device 510 based on the device identity or, where appropriate, credentials provided by the device 510 or a user of the device 510. The portal 508 may take active or passive measures to identify the device 510. Where the device 510 is not recognized, or the portal 508 otherwise is unable or refuses to admit the device 510 to the network 502 based on available information, the portal 508 may initiate a number of steps to conditionally admit the device 510 to the network 502. The portal 508 may also store device information for refused devices in the database 512 and maintain a list of such devices for future reference or for further action as contemplated herein.

It will be appreciated that, while the foregoing description contemplates admitted and non-admitted devices, any number of intermediate categories may also or instead be provided. For example, known and previously authorized devices for an enterprise may be configured to provide a secure heartbeat or the like to the portal 508 or threat management facility 506, and one list may be maintained for these devices that provide a heartbeat. Other devices may be refused entry on to the network 502, and the database 512 may provide an additional list of these devices (or they may be identified with a suitable, corresponding attribute in an aggregate list for all devices). Other devices may not be recognized but may, after scanning or the like, be determined to be sufficiently safe by the portal 508 or the threat management facility 506, e.g., by being otherwise in compliance with a security policy for the enterprise network 502. In some cases, limited network access may be granted to facilitate limited operation of the device 510 and, potentially, further information gathering and observation. A third, fourth, or more categories may be provided and a list of corresponding devices and network access restrictions may be stored in the database 512. Other categories, such as devices requiring human, administrative review or devices placed in a pool to be claimed by a device owner, may also or instead be stored in the database 512, along with any other categories necessary or useful for managing entry into an enterprise network as contemplated herein.

For example, in instances in which the device 510 is not recognized to be managed or manageable, the device 510 may be granted access to a limited set of high-reputation internet addresses, but not permitted to interact with other devices on the network. This may be accomplished, for example, with network configuration that limits communication to and from the device 510. This may be accomplished, for example, by assigning the device 510 to a VLAN that has limited network access to or from other devices on the network, or only to certain other devices and the portal 508. This may be accomplished by other techniques for preventing communication among devices on a network.

In one aspect, the portal 508 may present a landing page such as an HTML, page for network traffic from new devices appearing on the network, e.g., via an HTTP redirects form another network device. The landing page may provide a human-readable interactive interface for admitting the device 510 onto the network 502. This may, for example, initiate steps such as download and execution of an antivirus scanner by the device 510. This may also or instead include download and installation of a local security agent by the device 510. This may also or instead include a scan of the device for compliance with a security policy, such as by checking for current application versions, security patches and so forth on the device 510.

Where the portal 508 does not receive a response to the landing page, or the landing page is not requested by or presented to the device 510 for some other reason, the portal 508 may use other techniques such as any of those described above to attempt to identify the device 510. While the absence of a response may have any of a number of user-related causes, such as where a user chooses not to join the network 502, or is a malicious user that does not wish to be identified, the absence of a response may also result from limitations of the device 510 itself. For example, a variety of devices such as smart watches, eBooks, network-capable appliances or utilities and so forth, may have wireless networking capabilities but no graphical user interface for interacting with network content.

In some implementations, for example, where no response to the landing page is received, or where the device 510 is not recognized as a device capable of supporting user interaction with the landing page, or where the device 510 is recognized as a device that is not capable of supporting user interaction with the landing page, the device 510 may be stored in a list of pending devices in the database 512. In one aspect, the portal 508 may usefully publish a list of such pending devices, e.g., on an unclaimed device page, so that authorized users of the enterprise network can claim the devices and register them as safe for use on the network 502 or otherwise identify them for subsequent handling within the context of the network 502. Thus, a user who wishes to add the device 510 to the network 502, even where the device 510 cannot independently support user interactions for registration through the portal 508, may visit the unclaimed device page, scan unclaimed devices for the device 510, and then register or otherwise identify the device 510 so that the device 510 can be admitted onto the network 502.

In another aspect, network entry decisions may be provided to an administrator. This may include an entry in the manner described above. For example, where an unknown device attempts to access the network 502 using the landing page described above, an admission decision may be presented to the administrator through any suitable interface, either before or after the device 510 has completed steps that are otherwise required to bring the device 510 into compliance with an enterprise network security policy. The administrator may usefully receive a wide range of contextual information to assist in making a network admission decision including machine identification information, fingerprint(s), cookies, network addresses, network traffic patterns and any of the other information described herein.

In some implementations, a new device may be associated with a known or managed device, or with a user associated with the known or managed device, based on the time that the new device and the known device join the network. A device may be associated with another device or with a user using any suitable technique. For example, a user identifier or authentication credentials used by a user on more than one device may be detected. Further, or instead, network addresses or URLs accessed may be relatively unique to a user. Still further or instead, communication (e.g., administration or operational traffic) between the new device and another device may be detected on the network.

In some implementations, patterns or timing of network traffic may be useful for managing devices that require configuration. For example, if a new device is observed to join a network at the same time as one or more other devices of a user, it may be the case that the user has just arrived in the location of the network with his or her devices, including the new device. It may be that the new device was just configured by the user. Some IoT devices initially provide a private wireless network, and an owner of the device can connect a client (e.g., a phone or a laptop) to the provided private wireless network and communicate with the device using the private wireless network. Once connected to the private wireless network, for example, using an application or a web browser on the client, the owner can configure the new device to use the enterprise wireless network. Upon configuration, the new device may connect to the specified enterprise network. The owner may then change the client (e.g., phone or laptop) also to connect to the enterprise wireless network. When the known client device joins the network within a time threshold as the new device, the known client device and the new device may be identified as associated with one another. For example, messages may be directed to the owner of the known device (e.g., email, text messages, through a user interface, redirection of web traffic to the portal) to claim the new device in the portal. For example, an association with a known device or an owner may be provided on the portal to aid the owner or an administrator in identifying the new device.

Figure 6:
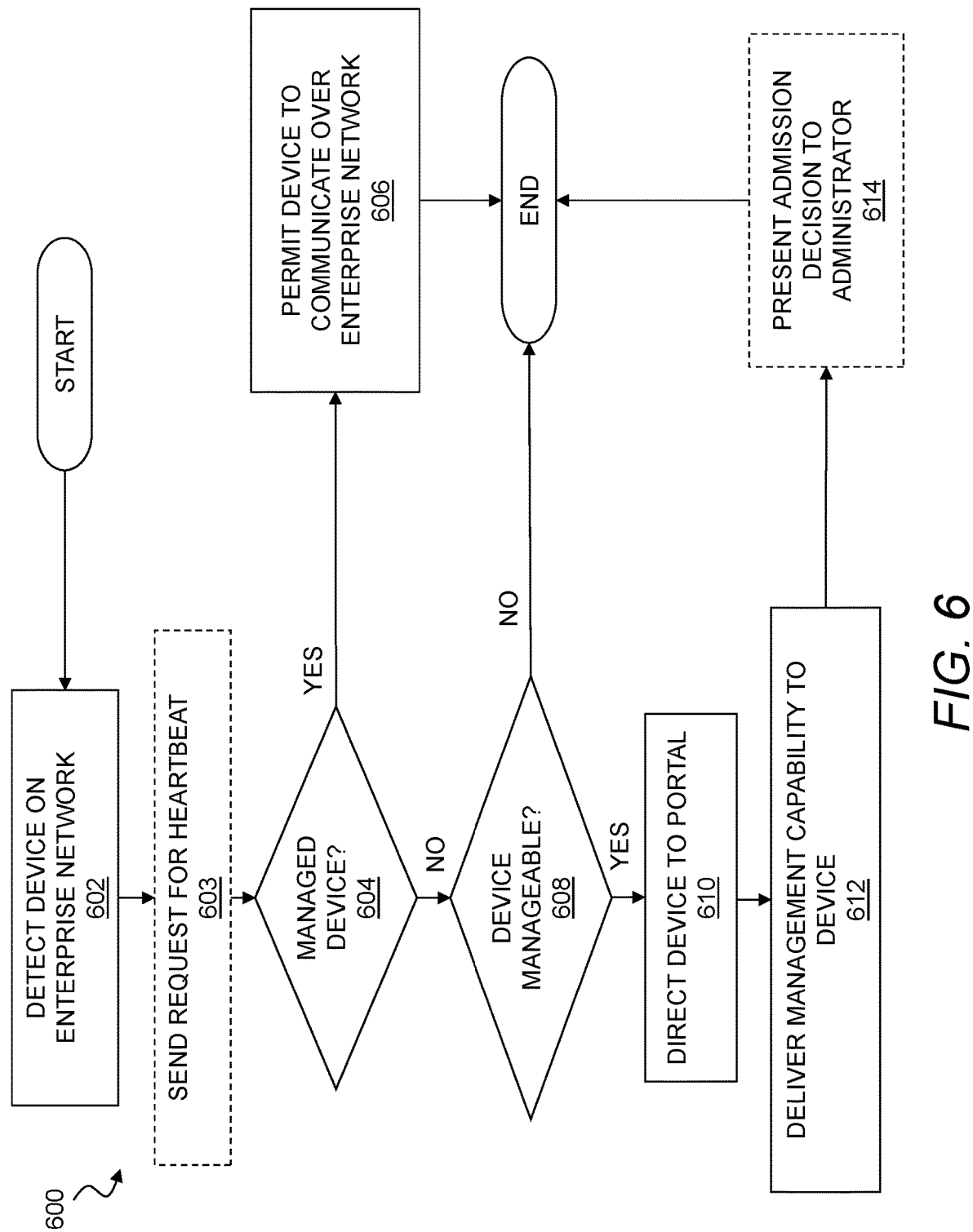
FIG. 6 is a flowchart of an exemplary method of managing admission of unrecognized devices onto an enterprise network.

FIG. 6 is a flowchart of an exemplary method 600 of managing admission of unrecognized devices onto an enterprise network. In general, unless otherwise specified or made clear from the context, the exemplary method 600 may be implemented by any one or more of the devices and systems described herein. Thus, for example, the exemplary method 600 may be implemented by the system 500 (FIG. 5). As a more specific example, the system may include one or more computing devices such as one or more of the threat management facility 506 and the portal 508 (and endpoints within the enterprise network using same), each including a processor and a memory, the memory storing non-transitory computer executable instructions that, when executing on the one or more computing devices, cause the one or more computing devices to perform one or more steps of the exemplary method 600. As described in greater detail below, the exemplary method 600 may address the challenge of admitting unrecognized devices onto an enterprise network while managing risk exposure of a set of managed devices on the enterprise network, e.g., by bringing the unrecognized device(s) into compliance with a security policy for the enterprise network before permitting use of network resources and connectivity within the enterprise network.

As shown in step 602, the exemplary method 600 may include detecting a device on the enterprise network. The device may be any one or more of various different devices capable of network communication and, more specifically, capable of communicating or attempting to communicate over the enterprise network. It should be appreciated that devices capable of such network communication are ubiquitous and may have a variety of different features, depending, for example, on a particular application associated with the device. Thus, examples of such devices may include, but are not limited to, any one or more of the devices described herein. By way of example, therefore, the device may be one or more of a laptop computer, a desktop computer, a mobile phone, a wearable device (e.g., a watch), an appliance (e.g., a refrigerator, a thermostat, a smart speaker), and other similar devices.

Detection of the device on the enterprise network may be based on detecting connection of the device to the enterprise network. Such a connection may be any one or more of the different connections described herein. More specifically, connection of the device to the enterprise network may include a physical connection through an Ethernet port and/or a wireless connection to a wireless access point or other short range wireless interface. Detection of the device may include detection by another device on the network, such as an endpoint, router, gateway, firewall, or other device that monitors communication on the network. Detection of the device may include detection by a server receiving a request from the device, for example, for an Internet Protocol (IP) address using the DHCP protocol. Detection of the device may include detection by a server or an endpoint that is tracking the other devices on its local network by their network address (e.g., IP address or MAC address).

As shown in step 603, the exemplary method 600 may optionally include sending a request to the device for a heartbeat indicative of an identity of the device or the security status of the device. This request may be sent from the portal described herein, or from a threat management facility or other security resource for the enterprise network. For example, as described herein, when the device is directed to the portal as an unrecognized device, the portal may initially attempt to query a local security agent on the device. If the device has an appropriate local security agent installed, the device can respond to the query by generating and responding with a heartbeat. In turn the presence or absence of the heartbeat in response to the query from the portal may form a basis for the determination in step 604 regarding whether the device is one of a set of managed devices.

If the device is a managed device, when the device connects to the network, the device may begin communicating with a threat management or other security resource for the enterprise network. In the back-and-forth of communication, the threat management or other security resource may send a request to the device for a heartbeat indicative of an identity of the device or a security status of the device.

In some implementations, the portal may request that a gateway or threat management facility that receives heartbeats from devices forward any heartbeat from the device to the portal. The portal may request the heartbeat itself or information communicated by the device in the heartbeat, such as identity or security status.

As shown in step 604, the exemplary method 600 may include determining whether the device is one of a set of managed devices for the enterprise network. In certain implementations, determining whether the device is one of the managed devices of the set of managed devices for the enterprise network may be based on whether the device provides a heartbeat to the threat management facility, with the presence of the heartbeat generally identifying the device as one of the managed devices of the set of managed devices and, similarly, the absence of the heartbeat generally identifying the device as an unmanaged device. By way of example, heartbeat communication with the threat management facility may include use of any of the heartbeats described herein, such as any one or more of the various different heartbeats described above with respect to FIG. 4. Thus, the heartbeat may be digitally signed or otherwise cryptographically secured to prevent unauthorized access to heartbeat data and/or to authenticate identity of the source device, as described herein.

While determining whether the device is one of the managed devices may be based on the presence of absence of a heartbeat, it should be more generally appreciated that additional or alternative techniques for identifying a managed device may be used. As an example, a firewall may detect traffic from an unknown or unrecognized internal network address such as an unknown internal IP address. This may include any IP address or other network address associated with a device that is not in a database of known devices and/or does not carry endpoint protection. More generally, this may include any of the techniques described herein for distinguishing unmanaged devices including endpoint-side techniques, server/firewall-side techniques, active techniques (e.g., through query and response), passive techniques (e.g., through fingerprinting or the like) as well as combinations of the foregoing.

As shown in in step 606, when the device is determined to be one of the managed devices of a set of managed devices for the enterprise network, the exemplary method 600 may include permitting the device to communicate over the enterprise network. As used in this context, permission to communicate over the enterprise network may include partial or complete permission to communicate over the enterprise network, as may be appropriate for managing, for example, different types of devices, different types of users, and/or devices of varying provenance. Thus, for example, devices permitted to communicate over the enterprise network based on detection of a heartbeat may be permitted more complete access to the enterprise network as compared to devices directed to a portal and subsequently permitted to communicate over the enterprise network, as described below. Devices may have network communication restricted through use of routing policies, a VLAN, directing other devices, or other methods.

As also shown in step 606, when the device is not one of a set of managed devices, the exemplary method 600 may include carrying out the step 608 of determining manageability of the device. In general, determination of manageability of the device may be based on any one or more of various techniques useful for determining characteristics of a device. Such techniques may span general categories of passive techniques, active techniques, and combinations thereof, as described herein.

In certain implementations, determining manageability of the device may include identifying the type or category of device and, optionally, comparing the type or category of device to a database of manageable and/or unmanageable types or categories of devices. For example, devices determined to lack a user interface suitable for interacting with a portal (e.g., for interacting with a landing page administered by the portal) may be categorized as unmanageable. Devices determined to be unmanageable may be denied access or may otherwise be restricted with respect to the enterprise network at least until such time as additional information related to the device can be obtained, as described in greater detail below.

Determining the type or category of the device, and thus determining whether the device is manageable, may be based on a fingerprint associated with the device and/or on any other form of identification of the device based on what the device reports about itself. The fingerprint may be based, for instances, on network traffic to or from the device. For example, the device may be identified based at least in part on detecting updater traffic. That is, in instances in which the device attempts to access a site associated with updates for a smart speaker, such information may be useful in identifying the device as a smart speaker. In instances in which the device attempts to access a site associated with updates for a particular operating system (e.g., Microsoft Windows), such information may be useful in identifying the device as a Windows-based machine. Further, or instead, the identification of the device may be based on one or more of packet header information or status reports obtained from communications by or with the device.

In some implementations, determining manageability of the device may include determining the response of the device to network communication, for example, by testing ports of the device, or other techniques. As used in this context, ports of the device should be understood to refer generally to logical sub-addresses for a network connection that can be addressed and used independently. As a matter of convention, these ports may be allocated to particular protocols, process types, network services, resources types, users and so forth. Responses of a device to testing on these ports may form at least a partial basis for determining manageability of the device. For example, ports identifying specific service types, when open and responsive on the device, may be useful for identifying the type or category of the device.

As shown in in step 610, if the device is an unrecognized device and determined to be manageable by the threat management facility according to step 608, the exemplary method 600 may include directing the device to a portal. For example, directing the device to the portal may include proxy redirection of the device to the portal, or any other form of network forwarding or redirection suitable for directing the device to the portal. In general, the portal may manage admission of the unrecognized devices onto the enterprise network. The portal may, for example, advantageously provide a user-friendly way of providing support, updating, and the like, to unrecognized devices that are new to the enterprise network, or that have been locked out of the enterprise network or otherwise denied access to network resources. Further, or instead, the portal may facilitate managing admission of unrecognized devices onto the enterprise network while making efficient use of administrator resources, e.g., by facilitating automatic network registration without human administrative oversight, or by gathering sufficient contextual information for a human administrator to make informed decisions about admitting new devices onto the enterprise network.

As shown in step 612, the exemplary method 600 may include, at the portal, delivering device management capability to the device. It should be understood that delivery of such capability to the device may depend, generally, on the type of device to which the management capability is being delivered. As an example, a mode of delivery of device management capability may differ depending on whether the device is of a type including a user interface. Further, or instead, once the device management capability is delivered to the device, a degree of access granted to the device to communicate over the enterprise network may depend on the type of device. By way of example, therefore, a device including a user interface may be granted less restricted access to the enterprise network as compared to access granted to a device without a user interface.

In certain instances, delivering device management capability to the device may include presenting a landing page to the device. In general, the landing page may have any functionality useful for managing access of an unrecognized device to the network. Thus, for example, the landing page may include interactively guiding a user of the device through a network entry procedure, with the interaction including one or more of registering the device, receiving user login credentials, downloading software, downloading a cookie, and the like. As should be appreciated, presentation of a landing page to the device may be particularly useful for a device having a user interface. However, as described in greater detail below, whether or not a device responds to the presentation of a landing page may itself serve as a useful way to assess manageability of the device.

In some instances, delivering device management capability to the device at the portal may include installing a local security agent on the device. Installation of the local security agent may be typically carried out through the landing page presented to the device, although it should be understood that the use of a landing page is not required. Further, or instead, the local security agent may be any one or more of the local security agents described herein. Thus, once installed on the device, the local security agent may communicate with the threat management facility (e.g., by sending a heartbeat) to identify the device as a managed device. Installation of a local security agent may be temporary, for example, to carry out scanning, or may be required for the duration of network access.

Delivering device management capability to the device may, further or instead, include scanning the device for compliance with a security policy. For example, the device management capability delivered to the device may be based on the results of the scan. As an example, the scan may determine whether the device has a version of one or more software programs, such as a current version required for compliance with a security policy. Thus, continuing with this example, delivering device management capability to the device may include checking versions of one or more software programs, as necessary, to bring the device into compliance with the security policy, and optionally updating such software or instructing a device user to update such software as need to bring the device into compliance. Further, or instead, scanning the device for compliance with a security policy may include applying a virus scan or other malware detection tool to identify potentially malicious code on the device that may pose a threat to the enterprise network if the device were granted access to the enterprise network.

More generally, any techniques for bringing the device into compliance with a security policy for an enterprise network, or otherwise identifying the device as safe or manageable, may be used to deliver management capability to the device 612 as contemplated herein.

As shown in step 614, the exemplary method may optionally include presenting an admission decision related to the device to an administrator. Typically, such an admission decision may be presented to the administrator through a user interface at the threat management facility. Presentation of the admission decision to the administrator may be useful, for example, for allowing the administrator to retain a useful amount of control over admission decisions while still making efficient use of the administrator's resources. For example, the admission decision may be presented to the administrator following delivery of management capability to the device in step 612 such that only a subset of devices (e.g., those devices that are manageable and have successfully received device management capability) are presented to the administrator for an admission decision. The administrator may deny admission to a device if there is an unusual volume of unrecognized devices or, more generally, if admission of the unrecognized device would be inappropriate or inadvisable.

The admission decision presented to the administrator may be presented in any one or more of various different forms useful for managing admission of the device to the enterprise network. For example, the admission decision may be presented to the administrator as a yes/no decision. The administrator may also or instead be presented with context for a decision in order to inform a decision, such as the machine type, machine name, machine or network packet metadata and so forth, any of which may provide useful context for determining whether to admit a device onto an enterprise network. In one aspect, the admission decision may be presented to the administrator with one or more options useful for managing devices that are granted access to the enterprise network. For example, the admission decision by the administrator may include limiting a degree of access granted to the device.

While managing admission of unrecognized devices onto an enterprise network has been described as including directing the device to a portal based on whether the device is manageable, it should be appreciated that an interaction between the device and the portal may itself be useful for identifying the device and/or determining whether the device is manageable. For example, certain devices may be unable to interact with the portal. In certain instances, admission of these devices to the enterprise network may require additional information to be input (e.g., by a user associated with the device).

Figure 7:
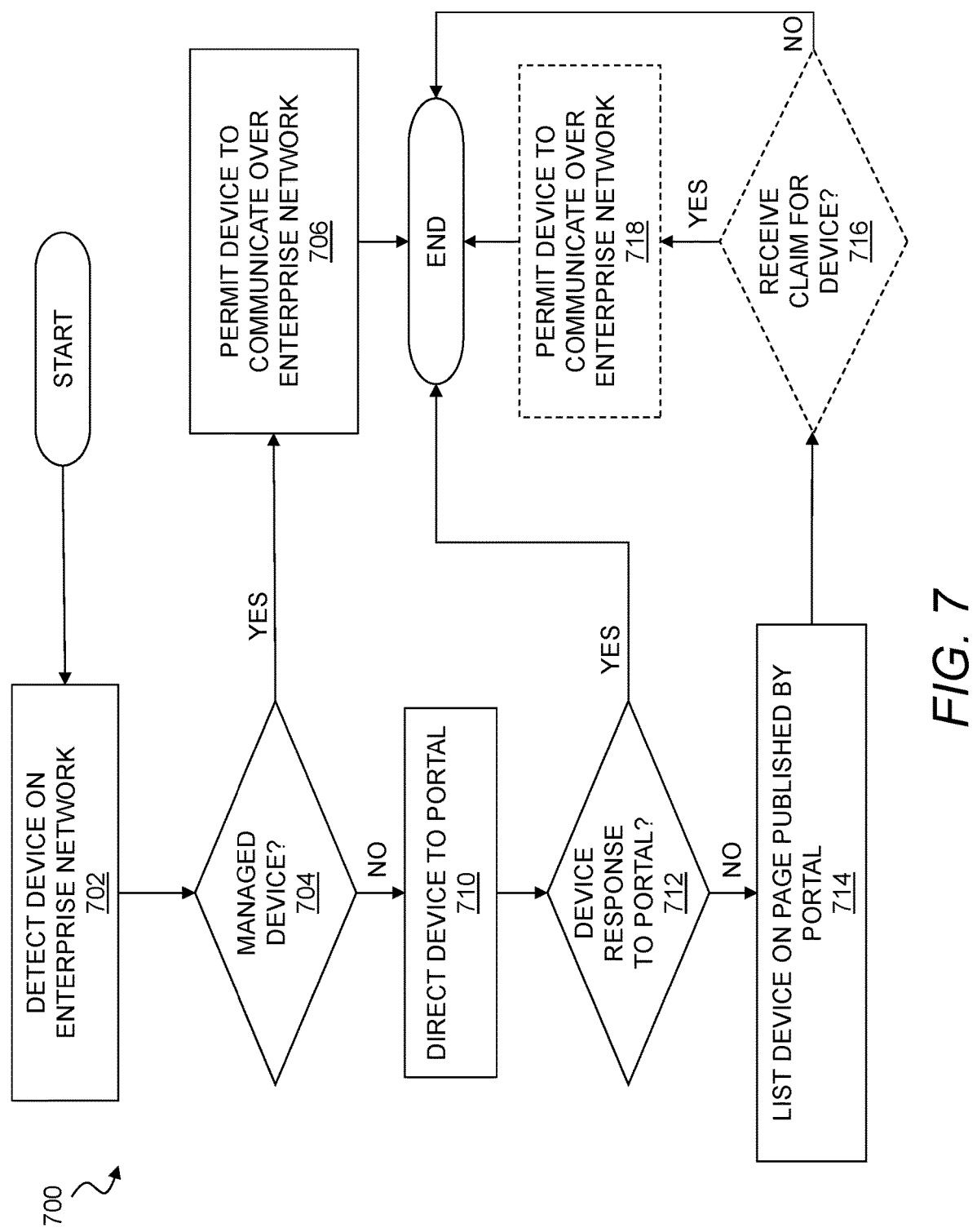
FIG. 7 is a flowchart of an exemplary method of using portal response for managing admission of unrecognized devices onto an enterprise network.

FIG. 7 is a flowchart of an exemplary method 700 of using portal response for managing admission of unrecognized devices onto an enterprise network. In general, unless otherwise specified or made clear from the context, the exemplary method 700 may be implemented using any one or more of the devices and systems described herein. Thus, for example, the exemplary method 700 may be implemented by the system 500 (FIG. 5). As a more specific example, the system may include one or more computing devices such as one or more of the threat management facility 506 and the portal 508 (and endpoints within the enterprise network using same), each including a processor and a memory, the memory storing non-transitory computer executable instructions that, when executing on the one or more computing devices, cause the one or more computing devices to perform one or more steps of the exemplary method 700. As described in greater detail below, the exemplary method 700 may address the challenge of providing robust support to unrecognized devices—particularly devices spanning a wide range of user interfaces and capabilities—for admission to an enterprise network while managing risk exposure of a set of managed devices on the enterprise network.

As shown in step 702, the exemplary method 700 may include detecting a device on an enterprise network. As shown in step 704, the exemplary method 700 may include determining whether the device is one of a set of managed devices for the enterprise network. As shown in step 706, when the device is identified as one of the set of managed devices for the enterprise network in step 704, the exemplary method 700 may include permitting the device to communicate over the enterprise network. Unless otherwise specified or made clear from the context, it should be appreciated that steps 702, 704, and 706 in the exemplary method 700 are analogous to the respective steps 602, 604, and 606 of the exemplary method 600 described above with respect to FIG. 6.

As shown in step 710, when the device is determined to be an unrecognized device in step 704, the exemplary method 700 may include directing the device to a portal for admission of unrecognized devices onto the enterprise network. The portal may be any one or more of the portals described herein and, thus, may include a landing page for interactively delivering device management capability to a device. For example, in instances in which the device includes a user interface and is generally compatible with interaction with the landing page, a user associated with the device may be guided through one or more steps for delivery of device management capability of the device, e.g., as generally described above. Examples of such steps may include one or more of receiving login credentials from the user, prompting the user to download software such as a security agent, receiving registration information for the device, and the like.

As shown in step 712, the exemplary method 700 may include determining a response of the device to the portal. In instances in which the device responds to the portal (in a manner consistent with administration/management of the device), the portal may deliver device management capability to the device according to any one or more of the techniques described herein and, in particular, as described above with respect to step 612 in FIG. 6. However, in instances in which the device does not respond to the portal or responds incorrectly or inadequately to the portal, such responses may indicate that the device is not manageable in a manner consistent with the security policy for the enterprise network. More specifically, unresponsiveness or incorrect responses by the device in response to the portal, may indicate that the device is an unmanageable device. As described in greater detail below, additional information may be required as a condition for permitting such unmanageable devices to communicate over the enterprise network.

In general, it should be appreciated that the portal may store information about registered devices, device types and so forth. Thus, the presence, absence, and/or type of response of the device to the portal may provide an indication of the manageability of the device. For example, determining the response of the device to the portal may include determining whether the device responded to a landing page administered by the portal, or to a redirect intended to direct the device to the landing page. In certain instances, the determination of the response of the device to the portal may include a timeout feature providing a predetermined period of time for responding to the portal, after which the device may be denied further access to enterprise network resources. Further, or instead, the determination of the response of the device to the portal may result in a determination of "no response" when incorrect responses are submitted by the device in response to prompts provided by the portal (e.g., incorrect login credentials, incorrect responses to a challenge-response test, and other prompts useful for identifying a user and/or a device).

As shown in step 714, the exemplary method 700 may include, based on the response of the device to the portal determined in step 712, listing the device on an unclaimed device page published by the portal and accessible to authorized users of the enterprise network. This usefully provides a repository for devices that appear unmanageable, e.g., because they are unknown or because they cannot be brought into compliance with a security policy for the enterprise network. Listing the device on the unclaimed device page may be subject to approval/editing by an administrator. That is, an administrator may remove or deny listing for a device otherwise meeting criteria for being listed on the unclaimed device page if, e.g., the administrator determines that the device cannot or should not be permitted access to network resources.

A listing for the device on the unclaimed device page may include any of various different types of information related to or known about the device. Further, or instead, the portal may request any of various different types of information related to the device, the authorized user, or both, as a condition or conditions for listing the device and/or allowing an authorized user to claim the device and/or as a condition or conditions for allowing different degrees of access to the enterprise network. Examples of information that may be requested by the portal for use with the unclaimed device page may include one or more of the device type, device serial number, registration information, user credentials, and other similar information useful for identifying the device and associating the device with the authorized user.

While listing the device on the unclaimed device page may be based on the response of the device to the portal determined in step 712, it should be appreciated that a decision to publish the device on the unclaimed device page, or the decision to include various types of device information, may be additionally based on other information gathered about the device. In general, such information about the device may be gathered according to any one or more of the techniques described herein. Thus, for example, listing the device on the unclaimed device page may be further based on, or the listing may include, a fingerprint of the device according to any one or more of the fingerprinting techniques described herein. Further, or instead, listing the device on the unclaimed device page may be based on performing a security scan of the device for compliance with a security policy. Continuing with this example, in instances in which the device is not in compliance with a security policy, the device may be denied listing on the unclaimed device page and/or additional information related to the device may be required as part of the process for listing and/or claiming the device.

In some implementations, the unclaimed device page may list a full inventory of unmanaged devices detected on the enterprise network and, further or instead, the unclaimed device page may distinguish unmanaged but manageable endpoints from unmanageable endpoints (e.g., through the use of different visual indicia). Further, or instead, the unclaimed device page may include a report showing one or more characteristics known about the unmanaged devices, with such characteristics including, for example, one or more of an operating system, an operating system version, a current IP address, and the like. In general, the information presented on the unclaimed device page may be any manner and form of information useful for facilitating identification of an unmanaged device that an authorized user wishes to claim. In addition, or in the alternative, the information presented on the unclaimed device page may be based on permissions for a particular authorized user to which the unclaimed devices page is presented. Still further, or instead, an administrator may be able to see a full inventory of devices on the network, with managed and unmanaged devices identified and, optionally, with potentially manageable devices flagged for possible action by the administrator.

As shown in step 716, the exemplary method 700 may, optionally, include receiving, from an authorized user of the enterprise network, a claim for the device from the unclaimed device page. The received claim may include any of various different types of information useful for associating the device with the authorized user. Thus, for example, receiving the claim may include registering the device in a database stored by the threat management facility. Such registration in a database may be useful for recognizing the device when the device is subsequently detected by the enterprise network which may, for example, be useful for efficiently providing access to mobile devices. As used herein, registration of the device may include obtaining and/or storing any information useful for identifying one or more of the device, the authorized user, and an association between the device and the authorized user.

As shown in step 718, the exemplary method 700 may, optionally, include permitting the device to communicate over the enterprise network based on the claim for the device on the unclaimed device page. In certain implementations, the permitting the device to communicate over the enterprise network in step 718 may include the same degree of permission provided to a device permitted to communicate over the enterprise network in step 706. It should be appreciated, however, that this may not be the case in certain implementations. For example, a greater degree of permission may be granted to devices via step 706 than may be granted to devices via step 718. More specifically, it may be useful to provide only limited access to a device that has been claimed from the unclaimed devices page, as such devices may pose an increased security risk as compared to managed devices.

While a response (or absence of a response) of a device to a portal has been described as being a basis for listing the device on an unclaimed devices page, it should be appreciated that additional or alternative criterion may be usefully applied as conditions to listing a device on an unclaimed devices page. For example, any one or more of the techniques for determining device manageability described herein may be used to determine whether a device is listed on an unclaimed device page published by a portal. Such additional techniques for determining device manageability may be particularly useful, for example, in instances in which a device is unresponsive to the portal but is nevertheless manageable. As a specific example, unresponsiveness of a device to the portal may be based on a choice made by a user associated with the device, although the device itself may be a manageable device.

Figure 8:
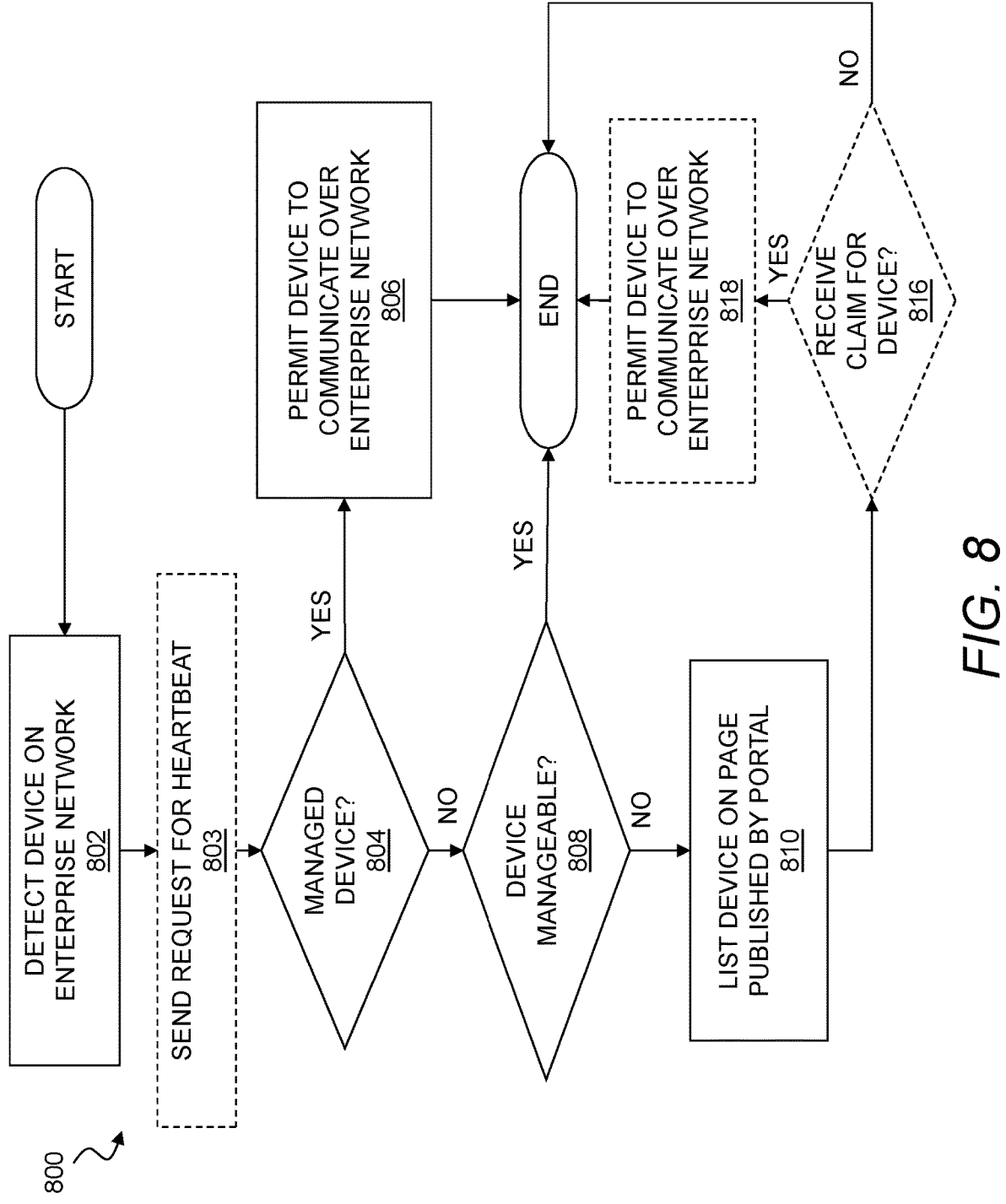
FIG. 8 is a flowchart of an exemplary method of managing claiming of unclaimed devices for admission to an enterprise network.

FIG. 8 is a flowchart of an exemplary method 800 of managing claiming of unclaimed devices for admission to an enterprise network. In general, unless otherwise specified or made clear from the context, the exemplary method 800 may be implemented using any one or more of the devices and systems described herein. Thus, for example, the exemplary method 800 may be implemented by the system 500 (FIG. 5). As a more specific example, the system may include one or more computing devices such as one or more of the threat management facility 506 and the portal 508 (and endpoints within the enterprise network using same), each including a processor and a memory, the memory storing non-transitory computer executable instructions that, when executing on the one or more computing devices, cause the one or more computing devices to perform one or more steps of the exemplary method 800. The exemplary method 800 may combine certain features of the exemplary method 600 (FIG. 6) and the exemplary method 700 (FIG. 7) to address the challenge of providing robust categorization and support of unrecognized devices—particularly devices spanning a wide range of user interfaces and capabilities—for admission to an enterprise network while managing risk exposure of a set of managed devices on the enterprise network.

As shown in step 802, the exemplary method 800 may include detecting a device on an enterprise network. As shown in step 804, the exemplary method 800 may include determining whether the device is one of a set of managed devices for the enterprise network. As shown in step 806, when the device is identified as one of the set of managed devices for the enterprise network in step 804, the exemplary method 800 may include permitting the device to communicate over the enterprise network. Unless otherwise specified or made clear from the context, it should be appreciated that steps 802, 804, and 806 in the exemplary method 800 are analogous to the respective steps 602, 604, and 606 of the exemplary method 600 described above with respect to FIG. 6.

As shown in step 808, the exemplary method 800 may include, when the device is not identified as one of the set of managed devices in step 804, determining manageability of the device. In general, determining manageability of the device in step 808 may be based on any one or more of the techniques for determining manageability described herein. Thus, unless otherwise specified or made clear from the context, determining manageability in step 808 shall be understood to be analogous to determining manageability in step 608 described above with respect to FIG. 6. Further, in instances in which the device is determined to be a manageable device in step 808, device management capability may be delivered to the device according to any one or more of the various different methods described herein and, in particular, according to steps 610 and 612 described above with respect to FIG. 6.

As shown in step 810, the exemplary method 800 may include, when the device is not a manageable device, listing the device on an unclaimed device page accessible by authorized users of the enterprise network and published by a portal for admission of unrecognized devices onto the enterprise network. Unless otherwise, specified or made clear from the context, listing the device on the unclaimed device page according to step 810 should be understood to be analogous to listing a device on an unclaimed device page according to step 714 described above with respect to FIG. 7. Thus, for example, listing the device on the unclaimed device page may include performing a security scan of the device for compliance with a security policy.

As shown in step 803, the exemplary method 800 may, optionally, include sending a request from the portal to the device for a heartbeat indicative of an identity of the device. This query from the portal to the device may be analogous, for example, to the query described above with respect to step 603 in FIG. 6.

As shown in step 816, the exemplary method 800 may, optionally, include receiving, from an unauthorized user of the enterprise network, a claim for the device from the unclaimed device page. In general, the receipt of the claim in step 816 should be understood to be analogous to the receipt of the claim in step 716 described above in FIG. 7. Thus, for example, receiving the claim may include registering the device in a database stored by the threat management facility.

As shown in step 818, the exemplary method may, optionally, include permitting the device to communicate over the enterprise network based on the claim for the device from the unclaimed device page. Permitting the device to communicate over the enterprise network according to step 818 should be understood to be analogous to the permission provided for in step 718 described above in FIG. 7. Accordingly, it should be appreciated that permission granted to a managed device in step 806 may differ from permission granted to a claimed device in step 818.

In one aspect, the network permissions granted in step 818 may be different, or substantially different, than network permissions granted to other endpoints. For example, where a user attempts to claim a smart device such as a personal health monitoring device, web camera, or other network-enabled device, the device may be determined to be unmanageable, but may be permitted limited network access, e.g. to a user-controlled endpoint such as a desktop computer where the user controls the device, or a remote service that the device couples to. By limiting network communications in this manner, and by notifying other managed devices to avoid communications with the device, network capabilities of the device can be enjoyed by the user/owner, while limiting exposure of other endpoints in the enterprise network to the device.

Having described various techniques for managing admission of devices into an enterprise network, the description now turns to certain techniques for managing endpoints in a heterogeneous network such as a network with a multi-subnet architecture or a network with devices that are unmanaged, e.g., not recognized, not registered to a threat management facility, or not brought into compliance with a security policy for an enterprise network.

In one aspect, endpoints within a subnet of a heterogeneous network may be configured to cooperatively respond to internal or external notifications of compromise in order to protect the endpoints within the subnet and throughout the enterprise network. For example, each endpoint may be configured to self-isolate when a local security agent detects a compromise, and to shun one or more of the other endpoints in response to a corresponding notification of compromise in order to prevent the other, compromised endpoint(s) from communicating with non-compromised endpoints. This can prevent further compromise either within the subnet or throughout the enterprise network.

Figure 9:
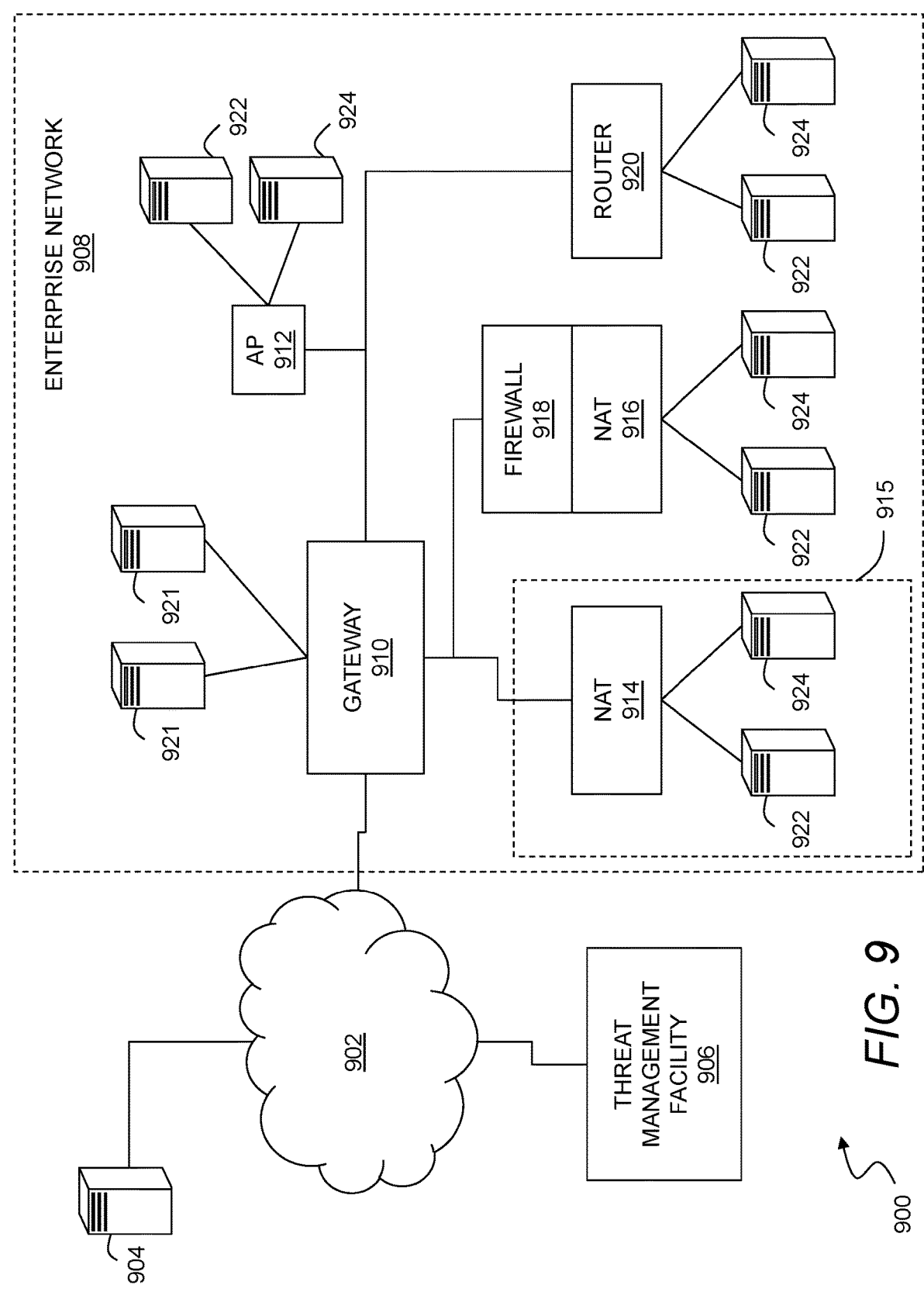
FIG. 9 illustrates a system including a heterogeneous network.

FIG. 9 illustrates a system including a heterogeneous network. In general, the system 900 may include a data network 902, an external device 904, a threat management facility 906, and an enterprise network 908. In general, the data network 902 may include any network for communicating data to, from, or within the enterprise network 908, including without limitation a public network, a private network or any combination of these. By way of non-limiting example, the data network 902 may include the Internet, a public cloud network, a private cloud network, a cellular data network, or the like. The external device 904 may be any client, server, endpoint, or other device contemplated herein that may communicate using the data network 902 with devices within the enterprise network 908.

The threat management facility 906 may include any of the threat management facilities described herein, and may be deployed outside the enterprise network 908, e.g., as a cloud service or other remote threat management facility accessible to the gateway 910 through an external network such as the data network 902. The threat management facility 906 may also or instead be a local threat management facility executing within the enterprise network 908, or some combination of these. In general, the threat management facility 906 is coupled in a communicating relationship with the gateway 910 and configured to monitor a plurality of endpoints associated with the enterprise network 908.

The threat management facility 906 may be configured to monitor a plurality of endpoints associated with the enterprise network 908 and to create a notification of compromise when a compromised endpoint is detected. For example, this may include monitoring a heartbeat such as the heartbeat described above from each of the plurality of endpoints, and detecting a compromise based on contents of the heartbeat or an absence of the heartbeat. Notifications of compromise may be communicated within the enterprise network 908 as necessary or helpful for network security. For example, a notification of compromise may be communicated to a compromised endpoint, such as where the compromise is detected remotely based on the heartbeat from the compromised endpoint or from malicious network traffic from the compromised endpoint. The notification of compromise may also or instead be communicated to other endpoints sharing a subnet within the enterprise network 908, to network devices managing communications within the enterprise network 908, or any other entities that might usefully review and act on the notification. In another aspect, the threat management facility may be configured to coordinate a remediation of any endpoints for which a compromise is detected.

The enterprise network 908 may include any of the enterprise networks or enterprise facilities described herein. In one aspect, the enterprise network 908 may be a heterogeneous network including a gateway 910, an access point 912, a network address translation device 914, a network address translation device 916 with a firewall 918, a router 920, and any other network elements such as switches, hubs, and so forth, all interconnecting a number of endpoints such as any of the endpoints or other computing devices described herein. For purposes of the following discussion, the endpoints may be categorized as unmanaged endpoints 922 and managed endpoints 924. Each of the network devices, endpoints, and other devices described herein may be deployed, for example on a computing device such as the computing device described above with reference to FIG. 2, or any other hardware platform with adequate processing power and network capabilities.

The gateway 910 may be deployed at a perimeter of the enterprise network 908, e.g., between the enterprise network 908 and the data network 902. In general, the gateway 910 may operate to monitor and control network traffic between devices in the enterprise network 908 and other devices such as the external device 904. The gateway 910 may provide a firewall, out-of-band heartbeat monitoring, and other services in support of more general gateway functions. The gateway 910 may also provide additional services to support security and communications for devices within the enterprise network 908 such as routing, traffic filtering, malware detection, firewall services, and so forth for managing and securing communications among devices within the enterprise network 908. The gateway 910 may also or instead provide an administration console for management of network resources, security policies, and so forth. Functions of the gateway 910 may be provided in a cloud network, such that the gateway 910 communicates with a gateway or firewall (not shown) within a cloud network or at an edge of the cloud network.

The access point 912 may be any access point, such as a wireless access point, a physical network port, a network switch, or any other access point supporting connectivity with and through the enterprise network. The access point 912 may include a firewall, router, switch, or any other network devices or services suitable for managing network connectivity and security using the access point 912.

The network address translation device 914 may be any device that maintains a subnet for the enterprise network 908. The network address translation device 914 may, for example, create a subnetwork such as a logical subnet that uses a different routing prefix than other logical or physical sections of the enterprise network 908, or otherwise supports a different routing domain or the like. In general, network address translation may include remapping an IP address space into another IP address space by modifying header information for packets traversing the network translation device 914. While this can significantly simplify addressing in heterogeneous networks, it can also introduce significant challenges where distinct addresses in a logical subnet behind the network translation device 914 are hidden from devices outside of the logical subnet. A network translation device 914 may obscure or otherwise prevent access to translation tables, or may control access to such tables through vendor-specific and/or proprietary interfaces, making it difficult or impossible for devices outside the logical subnet to associate traffic from within the logical subnet with specific endpoints. Also, since addresses for devices are hidden, it may be impossible to probe particular endpoints from outside the subnet. Regardless of configurations and protocols, a network address translation device may generally serve to manage communications between a subnet and an enterprise network or other networks. A network address translation device, as contemplated herein, may usefully be configured to forward security-related traffic such as heartbeats, notifications of compromise (e.g., notifications that specifically identified other, compromised endpoints on the subnet) and so forth, either using an explicit control channel such as an out-of-band communication channel, or implicitly by embedding corresponding control information in other network packets.

A network address translation device 916 may also include a firewall 918 that manages traffic through the network address translation device 916, e.g., by dropping or forwarding packets based on any suitable rules. The network address translation devices 914, 916 may be coupled in a communicating relationship with devices on a subnet 915 such as one or more unmanaged devices 922, one or more managed devices 924, as well as to a gateway 910 or other network device(s) in the enterprise network 908. Although only one subnet 915 is depicted, it will be understood that network devices within the enterprise network 908 may provide any number of subnets necessary or helpful for supporting a particular enterprise. In general, a subnet 915 may include a logical subnet having a different routing prefix than a remaining portion of the enterprise network, and/or a physical subnet having a different routing prefix than a remaining portion of the enterprise network.

A router 920 may be coupled in a communicating relationship with any number of endpoints such as one or more unmanaged devices 922 and one or more managed devices 924, as well as a gateway 910 and any other network devices for the enterprise network 908. In general, the router 920 may route traffic within the enterprise network 908 according to destination addresses in packet headers. In general, the router 920 may be any router suitable for forwarding data packets between computer networks or network devices, and will include two or more data lines connected to different networks. It will be understood that a router 920 as contemplated herein may also support a firewall, virtual private network handling, network address translation, policy-based routing, and any of a variety of security functions. For example, the router 920 may perform packet inspection, encryption/decryption, and any of the other security functions described herein.

One or more servers 921 or the like may be connected to the gateway 910 and any other endpoints or other network devices within the enterprise network 908. The servers 921 may, for example, include file servers, electronic mail servers, media servers, databases, web servers for hosting internal web content, key management system, or any other server, network service, or the like suitable for use by devices within the enterprise network 908.

The unmanaged devices 922 may include any of the endpoints or other devices described herein. In general, an unmanaged device 922 is a device that is not presently in compliance with a network security policy. This may be for any number of reasons. For example, the unmanaged device 922 may belong to an enterprise user that has not yet registered the device with the threat management facility 906 for the enterprise network 908, e.g., because the device is a new computer recently acquired by the user, or because the device is a home computing device that the user has brought to work and connected to the enterprise network 908. The unmanaged device 922 may not be capable of being managed, for example, it may be a network-enabled IoT device as described above, such as a smart speaker, thermostat, or coffee machine that is not capable of running endpoint management software. The unmanaged device 922 may also or instead be an unrecognized device that appears on the enterprise network 908 and fails to be brought into compliance with enterprise policies, e.g., using the techniques described above for claiming unmanaged devices. A managed device also may be treated as an unmanaged device, for example, if the device has fallen out of compliance with a security policy, e.g., due to a malware compromise, or due to a potential vulnerability such as a missing software patch or a failure to execute a local security agent.

While unmanaged devices 922 are generally described herein in terms of admission into a network or rejection of admission into the network, it will be understood that a tiered connectivity scheme may also or instead be employed.

For example, an unmanaged device 922 may be permitted access with varying restriction levels such as: full access, full access with heightened monitoring of communications, access to a limited subset of local servers and resources, access only to Internet or external resources, access with restricted bandwidth until an unmanaged device 922 can be admitted into the network or positively identified as malicious, permitted connectivity only on certain subnets, or denied any network connectivity.

The managed devices 924, by contrast, may be devices that are in compliance with a security policy for the enterprise network 908 as determined based on, e.g., a machine identifier for the device, installation or execution of a local security agent on the device, receipt of a heartbeat from the device, up-to-date software patches for applications, an operating system, the registry, drivers, and so forth on the device, authentication of a user of the device, or any other criterion or combination of criteria suitable for ensuring that the managed device 924 is being monitored by the threat management facility 906 and/or is in compliance with any requirements for secure operation within the enterprise network 908. A managed device 924 may include any of the endpoints described herein such as a desktop computer, a laptop computer, a mobile phone, a tablet, or the like. This may also include any other networked device such as a printer, a display, a networked appliance, a smart device, or any other device capable of connecting to the enterprise network 908 and executing a local security agent or otherwise coming into compliance with a security policy for the enterprise network 908. The unmanaged devices may also include any of these devices, as well as any other devices that might connect to, or attempt to connect to, the enterprise network 908, even where such devices are physically incapable, e.g., due to hardware or software limitations, of coming into compliance with the security policy.

Managed devices 924 may usefully cooperate to augment security functions of the threat management facility 906 and other network devices in a variety of ways. In general, a managed device 924 can provide a trusted beachhead within a subnet. From this posture, the managed device 924 may be configured to monitor activity within the subnet, identify other network devices communicating over the subnet, report failed login or authentication attempts, record information about unmanaged devices 922 on the subnet, and so forth. A managed device 924 may also be configured, e.g., through a local security agent or the like, to self-report information such as MAC addresses, local addressing information, machine fingerprints, an SSH fingerprint, and so forth, that may be used to identify the managed device 924 and use the managed device 924 in an integrated security management system. In one aspect, the managed device may report a 5-tuple including, e.g., a source IP address, a destination IP address, a source port, a destination port, and an IP protocol. This information may be used, e.g., at a firewall or the like to identify endpoints associated with a particular network packet or other communication.

A managed device 924 may also proactively engage in security functions for the subnet. For example, a local security agent on a managed device 924 may be configured to self-isolate in response to a local detection of compromise such as behavioral or signature-based detection of malware, or compromise detection using any other suitable technique or combination of techniques. Self-isolation may partially or wholly restrict network communications for the managed device 924 that has self-isolated. For example, self-isolation may prohibit all outbound communications from the managed device 924, or all outbound communications except for communications to the threat management facility 906 or some other security resource for the enterprise network 908. Self-isolation may also or instead restrict inbound communications, such as by blocking all inbound communications or all inbound communications except communications from the threat management facility 906 or some other security resource for the enterprise network 908. Self-isolation may include any suitable blocking or filtering, for example, blocking or filtering traffic from some networks or endpoints, blocking or filtering new inbound or outbound connection requests, blocking or filtering certain types of traffic, blocking or filtering communication to or from certain types of applications or processes, blocking or filtering traffic from all unmanaged devices, and so on. This self-isolation may be maintained for any suitable duration, such as until a compromise has been verified, until a remediation is completed, until one or more compromised processes have been terminated or restarted, until the managed device 924 is returned to compliance with security policies for the enterprise network 908 and so forth.

The local security agent on a managed device 924 may also or instead be configured to shun other endpoints in the enterprise network 908. This may, for example, include shunning other endpoints in the subnet for the managed device 924, e.g., in response to a notification of compromise of the one of the other endpoints. Subnet shunning in this manner may provide particular advantages because the compromised endpoint(s) can be accurately identified within the subnet based simply on an IP source address. Through a combination of shunning capabilities and self-isolation capabilities, each managed device 924 may usefully contribute to the security of a subnet of the enterprise network 908, and more generally to the security of the enterprise network 908 as a whole. Various different devices associated with the enterprise network 908 may provide a notification of compromise to the managed device 924 as contemplated herein. For example, a network device within the enterprise network 908 such as a router, switch, gateway, network address translation device, access point, or the like may receive the notification of compromise from a firewall for the enterprise network 908, which may originate the notification of compromise based on a detection of network traffic indicative of a compromise. In another aspect, the network device may receive the notification from one of the plurality of endpoints in the enterprise network, such as one of the managed devices 924 within a subnet associated with the network device. It should also be understood that an endpoint may create a notification of compromise based on an internal detection of compromise, e.g., by a local security agent, or based on suspicious or malicious activity detected by another device (such as a managed device 924 or unmanaged device 922) connected to the subnet.

The managed devices 924 may also or instead be configured to provide a notification when a compromise has been resolved, e.g., to the threat management facility 906, or to request re-entry into the enterprise network 908. In another aspect, one of the managed devices 924 may similarly be configured to receive an instruction, at the local security agent or otherwise, to end a self-isolation condition, or to end a shunning process, when a return to compliance is remotely detected or confirmed.

Using managed devices 924 as a tool in an integrated security system can advantageously facilitate improved network security in heterogeneous networks, e.g., by permitting threat management tools to investigate subnets and deploy suitable responses to suspicious activity or devices within the subnet. This may help to protect the enterprise network against attacks such as credential theft, lateral movement, and the like that might otherwise exploit information gaps created when an enterprise network is divided into multiple physical or logical networks managed by different network devices and using different address spaces.

According to the foregoing, there is disclosed herein a system including an enterprise network with a gateway to an external network and separated by routers or other network devices into a number of logical subnets such as subnets having different routing prefixes. A plurality of endpoints such as any of the endpoints described herein may be interconnected in one of the subnets of this enterprise network and configured, e.g., by a local security agent to self-isolate in response to a local detection of compromise, and to shun one of the other endpoints in the subnet in response to a notification of compromise of one of the other endpoints. The system may also include a network address translation device coupled in a communicating relationship with the subnet and the gateway that is configured to manage communications between the subnet and the enterprise network. The network address translation device may, in this context, usefully be configured to forward the notification of compromise from the gateway to one or more of the plurality of endpoints in the subnet identifying one or more other ones of the plurality of endpoints in the subnet for which a compromise is detected. This may advantageously permit endpoints within the subnet to accurately identify and begin shunning the compromised endpoint(s), even if a subnet source address for a compromised endpoint is obscured to the gateway by the intervening network address translation device.

This system such as any of the systems described herein may more generally be employed in any context where a network device is coupled between a subnet and an internet. That is, the system may usefully operate through a firewall, gateway, network address translation device, router, access point, or other network device, particularly when there is a different routing domain on each side of the network device. Thus, for example, the system may include a plurality of endpoints interconnected in a subnet of an enterprise network, where each of the endpoints is configured by a local security agent to self-isolate in response to a local detection of compromise, and to shun one of the other endpoints in response to a notification of compromise of one of the other endpoints, along with a network device coupled in a communicating relationship with the subnet and an internetwork that is configured to manage communications between the subnet and the internetwork, and to forward a notification of compromise to one or more of the plurality of endpoints identifying one or more other ones of the plurality of endpoints (e.g., in the subnet) for which a compromise is detected.

A heterogeneous network that is instrumented and managed as described herein can provide substantial advantages. For example, improved detection of activity in subnets may facilitate improved detection of attempts at lateral movement or credential theft. This can also facilitate device-specific analysis and evaluation of health status for unmanaged devices based on information from endpoints within a subnet and network devices carrying traffic to and from the subnet. As noted above, managed devices 924 can also or instead cooperatively provide isolation and shunning in a manner that permits device-specific isolation of compromised or potentially malicious devices within a subnet, even when such devices are not managed or otherwise compliant with enterprise network security policies. Thus, the disclosed system can more flexibly respond when an attempt at lateral movement or other malicious activity is detected.

Figure 10:
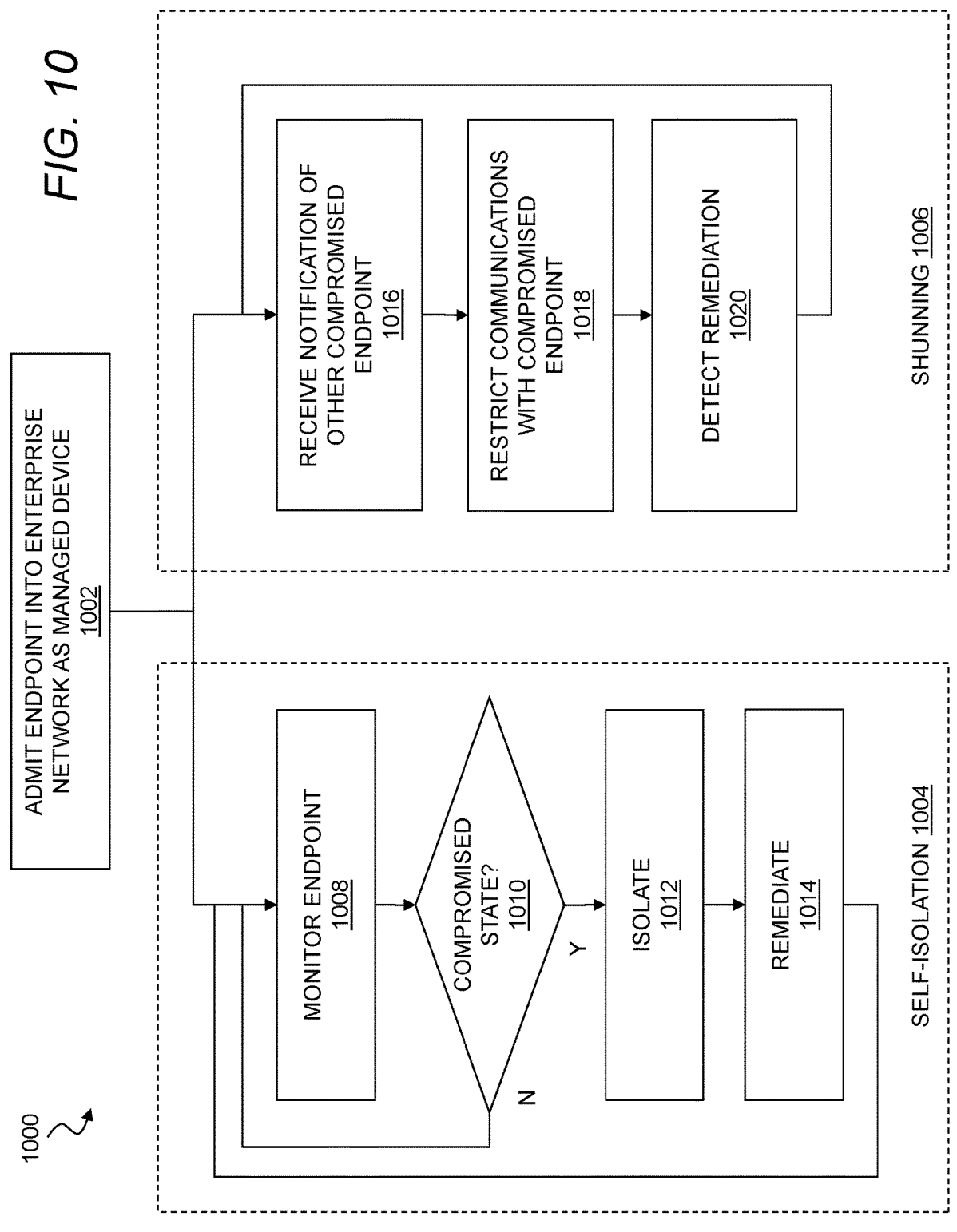
FIG. 10 illustrates a process for operating an endpoint in an enterprise network.

FIG. 10 illustrates a process for operating an endpoint in an enterprise network. In general, an endpoint in an enterprise network may be configured to respond to internal and external detections of compromise in a manner that permits the endpoint to cooperate with other endpoints to secure the enterprise network. For example, the endpoint may be configured to self-isolate when local monitoring detects a compromise on the endpoint, and to respond to an external notification of compromise of another endpoint by restricting communications with that other endpoint. This self-management may be implemented using any number and combination of techniques, which may be implemented, for example, across an enterprise network or within a logical subnet behind a network address translation device (or some combination of these). For example, an endpoint may be configured to block or filter traffic from a compromised endpoint. An endpoint may also or instead direct other devices on the network to take steps that result in blocking or filtering traffic from the compromised endpoint. In another aspect, an endpoint may send an indication of compromise to another endpoint. For example, an endpoint may direct an access point, gateway, firewall, network address translation device, or other network device to block or filter communications from another endpoint, or request that a threat management facility do so.

An endpoint such as a managed endpoint may also or instead be used to locally monitor other endpoints, e.g., endpoints behind a network address translation device. For example, a managed endpoint may monitor for traffic with a compromised endpoint, and provide information about traffic with the compromised endpoint to a network device or threat management facility. For example, upon a network connection request to a network address outside of a subnet that is initiated by a compromised endpoint, the managed endpoint may communicate to the gateway or threat management facility that the origin of the connection request is the compromised endpoint. The gateway or threat management facility can then take steps to restrict the communication. In this way, the managed endpoint can be used to alert other network devices about traffic involving the compromised endpoint, even if the compromised endpoint is hidden from the other network devices, such as by network address translation or due to other causes of address obfuscation or the like.

As shown in step 1002, the method 1000 may include admitting an endpoint into an enterprise network as a managed device. In general, this may include any of the endpoints and enterprise networks described herein, and the process for admitting the endpoint may include any of the techniques described herein. By way of non-limiting example, this may include coupling to an access point, providing credentials of a user of the enterprise network, scanning an endpoint for malware and policy compliance, and installing a local security agent on the endpoint. The local security agent may report on the health and status of the endpoint, provide local security services such as file scanning and behavioral monitoring, coordinate to receive policy and security updates from a threat management facility, and so forth. This may also or instead include any other steps or techniques for ensuring the identity of a user, trustworthiness of a computer, and compliance with security policies for the enterprise network (including initial compliance at the time of admittance, as well as ongoing compliance via software patches, behavioral monitoring, file scanning, health monitoring, and so forth).

In general, once admitted to the enterprise network as a managed device, the endpoint may perform one or both of two general tasks identified in FIG. 10 as self-isolation 1004 and shunning 1006. These two tasks may be executed by a local security agent, and may be performed concurrently, sequentially, or some combination of these. When a group of managed devices such as a number of managed devices on a subnet of the enterprise network collectively perform these tasks, the group of endpoints can advantageously cooperate to improve security of the subnet even in the presence of unmanaged devices, and even where the subnet is separated from other threat management resources by a network address translation device or other network device that obscures identifying information (such as IP addresses) for endpoints on the subnet.

As shown in step 1008, the method 1000 may include monitoring the endpoint using any of the techniques described herein including, without limitation, behavioral monitoring, signature-based monitoring (such as detecting malware executing on the endpoint with an antivirus scanner), network traffic monitoring, and any other techniques or combinations of the foregoing suitable for detecting the presence of malware or other compromised conditions on the endpoint. In another aspect, monitoring may include monitoring for notifications from a remote resource such as a gateway or threat management facility concerning a compromise or potential compromise of the endpoint, e.g., based on a heartbeat error, a compromise reported in a heartbeat communication, an observed network request, or malicious network traffic patterns.

As shown in step 1010, the method 1000 may include detecting a compromised state as a result of the monitoring. If no compromised state is detected, the method 1000 may return to step 1008 where monitoring of the endpoint continues using any suitable techniques. When a compromised state is detected, the method 1000 may, in response to the compromised state, proceed to step 1012 for further processing.

As shown in step 1012, the method 1000 may include isolating the endpoint. This may, for example, include self-isolating wherein the endpoint restricts communications between the endpoint and one or more other endpoints on the enterprise network, such as one or more other endpoints on a subnet of the enterprise network used by the endpoint, or more generally, other endpoints throughout the enterprise network.

As shown in step 1014, the method 1000 may include remediating the endpoint using any suitable techniques. In one aspect, this may include notifying a network device for the enterprise network, such as a gateway, firewall, router, or threat management facility, of the compromised state in order to facilitate management of more general security measures across the enterprise network. This may also or instead include deploying local security measures to identify and address the source of a compromise, such as by scanning the endpoint for affected files. In another aspect, this may include receiving and installing/executing malware removal tools from a threat management facility, or otherwise taking steps alone or in cooperation with other security infrastructure for the enterprise network to remediate the endpoint.

After any remediation steps have been completed, the endpoint may resume communications with other endpoints (e.g., terminate self-isolation) and return to monitoring for compromised states in step 1008.

Turning to the shunning process 1006 noted above, the method 1000 may include receiving a notification of compromise of one of the other endpoints on the enterprise network, as shown in step 1016. This may, for example, include a notification from a network device that maintains a subnet associated with the endpoint, or any other network device that might provide or forward a notification of compromise as contemplated herein. Within the subnet, which typically has a unique routing domain, receiving the notification may further include receiving a notification that includes an identification of an IP address of the endpoint within the subnet. This may, for example, be generated by another endpoint within the subnet that detects potentially malicious traffic from a neighbor, or by a router or network address translation device maintaining the address space for the subnet. This may also or instead include a notification generated by a threat management facility, enterprise network gateway, or other device, however for notifications external to the subnet it may be necessary to translate address information so that it can be applied within the subnet.

In some implementations, an endpoint within a subnet may be directed to assist with identification of a compromised endpoint or otherwise cooperate in detection and remediation of compromised endpoints. For example, the endpoint may be directed to monitor some or all traffic within the subnet, for example, all traffic to or from a particular address or range of addresses. The endpoint may be directed to report an endpoint that originated traffic to a device or address range or received traffic from a device or address range. For example, the endpoint may be directed to monitor all traffic directed to or from a network address or address range outside of the subnet. The endpoint then may be asked to identify the endpoint on the subnet that originated traffic to that network address or received traffic from that network address, e.g., by subnet address, external network socket, machine identifier, or any other useful identifier or combination of identifiers. In some cases, the endpoint may be provided with time or times of traffic of interest, or with some or all of the header or content of a packet or packets communicated in order to narrow down the endpoint in question. In this way, a network device or threat management facility outside of a subnet may identify an endpoint that communicated traffic indicative of compromise, report the compromised endpoint, and/or take steps to restrict communication with the compromised endpoint, e.g., in a manner that assists a threat management resource outside a subnet with managing security within the subnet.

The managed endpoint may then be directed to monitor traffic to or from the compromised endpoint, and to identify traffic to or from the compromised endpoint to a network device or threat management facility. For example, upon a network connection initiated by the compromised endpoint, the managed endpoint may report that the origin of the connection is the compromised endpoint. In this way, the managed endpoint can be used to alert other network devices, such as a firewall, gateway, and so on, about traffic involving the compromised device, even if the compromised device is hidden by network address translation. The network device can then take steps to restrict communication with the compromised endpoint.

As shown in step 1018, the method 1000 may include, in response to the notification of compromise, restricting communications from the other endpoint identified as compromised in the notification of compromise. Within a subnet of the enterprise network with a unique routing domain, this may more specifically include restricting communications from the IP address of one of the other endpoints within the subnet of the enterprise network.

As shown in step 1020, the method 1000 may include identifying a remediated state of the compromised endpoint, e.g., through a follow-up notification from the network device, a restored heartbeat from the compromised endpoint, or any other suitable technique. Once the remediated state has been identified or detected, communications with the compromised (and now remediated) endpoint may resume, and the method 1000 may return to step 1016.

According to the foregoing, a system as contemplated herein may include a processor on an endpoint, a network interface for coupling the endpoint in a communicating relationship with an enterprise network, and a memory bearing instructions executable by the processor to provide a security agent for the endpoint. The security agent may be configured to self-isolate the endpoint by performing the steps of detecting a compromised state of the endpoint, and in response to the compromised state, notifying a network device for the enterprise network of the compromised state and restricting communications between the endpoint and one or more other endpoints on the enterprise network, the security agent further configured to shun other endpoints in the enterprise network by performing the steps of receiving a notification of a compromise of one of the other endpoints on the enterprise network from the network device, and in response to the notification of compromise, restricting communications from the one of the other endpoints within the enterprise network.

As noted above, the notification of compromise may include an identification of an IP address of one of the other endpoints, and restricting communications from one of the other endpoints may include restricting communications from the IP address. The identification may also or instead identify one or more network adapters of the compromised endpoint, such as a MAC address or other identifier that is not dependent on the IP addressing space. This latter approach may usefully permit identification of machines in a manner that does not depend on the particular network or subnet where the endpoint is located. Thus, in one aspect, the device may be configured to restrict communications using any of the network adapters of the compromised device to identify restricted traffic. At the same time, an endpoint on a subnet may usefully determine a MAC address of one of the other endpoints on the subnet and report the MAC address to a firewall for the enterprise network. This may be performed in response to a specific detection of compromise by the other endpoint, or as a general background process performed, e.g., by security agents of endpoints coupled to a subnet.

As a significant advantage, the foregoing techniques may provide good local sensitivity to certain types of malicious activity characterized by certain types of traffic between endpoints. For example, detecting a compromised state may include detecting a credential theft attempt on one of the endpoints, as characterized for example, by searching for credentials files or information from a remote location. Detecting a compromised state may also or instead include detecting a lateral movement attempt including attempted access from the endpoint to one of the other endpoints in the enterprise network. Detecting a compromised state may also or instead include detecting an attempted exfiltration of data from the endpoint. These types of compromises each have characteristic patterns of behavior on an endpoint and within the enterprise network, and may be usefully addressed using the techniques described herein. More generally, detecting a compromised state may include detecting malware executing on an endpoint or detecting network traffic within the enterprise network indicative of a compromised endpoint.

As described herein, other techniques such as techniques for monitoring an endpoint heartbeat or monitoring compliance with security policies for the enterprise network, may also or instead be usefully employed.

Figure 11:
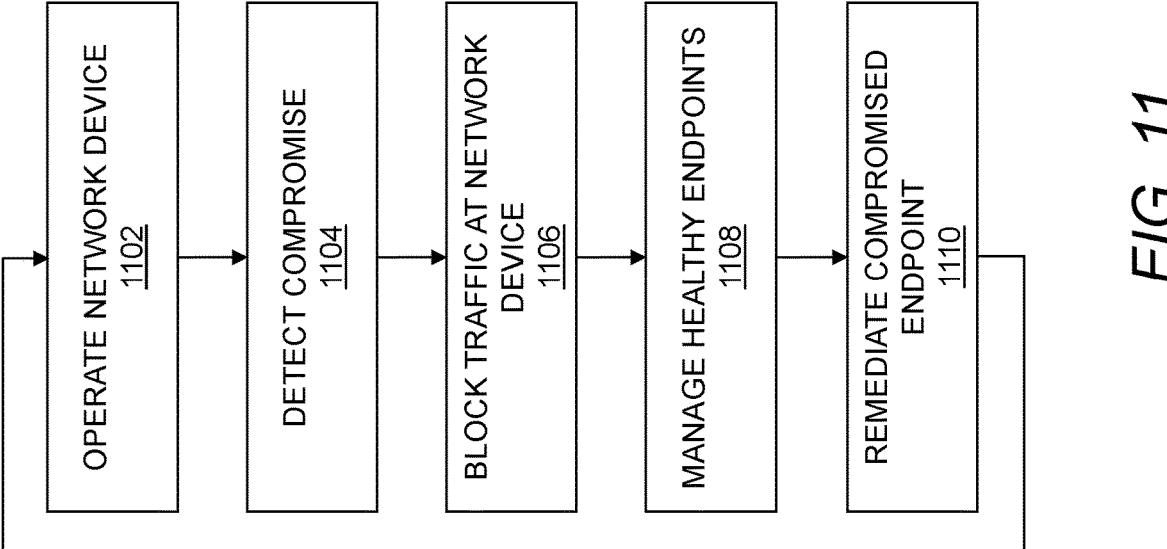
FIG. 11 shows a method for using a network device to secure an endpoint in a heterogeneous network.

FIG. 11 shows a method for using a network device to secure an endpoint in a heterogeneous network. In general, a firewall, gateway, router, access point, network address translation device or similarly situated network device can cooperate with endpoints on a subnet of an enterprise network to secure endpoints within the subnet. For example, the network address translation device may be configured, either alone or in cooperation with other network devices, to block traffic from a compromised endpoint to destinations outside the subnet, and to direct other endpoints within the subnet to stop network communications with the compromised endpoint.

As shown in step 1102, the method 1100 may include operating a network device that couples a subnet including a number of endpoints to an enterprise network. The network device may, for example, include a network address translation device, a router, a gateway, or any other network device that bridges two or more separate networks with independent addressing domains. For a router, operating the network device may include routing network traffic through a router. For a network address translation device, operating the network device may include translating address information at a network address translation device, e.g., by translating address information between a first routing prefix for the subnet and a second routing prefix for a network external to the subnet. The external network may include the remaining address space of the enterprise network, or an external network such as the Internet or any other internetwork or the like external to the enterprise network.

As shown in step 1104, the method 1100 may include detecting a compromised one of the plurality of endpoints on the subnet, such as by detecting a compromised one of the plurality of endpoints on the subnet based on an error in a heartbeat from the one of the plurality of endpoints. An error in the heartbeat may include an omission of an expected heartbeat, e.g., where a heartbeat is expected on some periodic or other scheduled basis, or an error in content of the heartbeat, such as an express indication of compromise or an improper signature. More generally, any of the techniques described herein, or any other technique or combination of techniques suitable for detecting a compromise, may be used to detect a compromised endpoint as contemplated herein. As described above, this may also or instead include detecting a device that is not currently managed by a threat management facility, or that cannot be brought into compliance with a security policy or otherwise managed within the enterprise network.

Numerous techniques may be used to detect a compromise as contemplated herein. For example, detecting the compromised one of the plurality of endpoints may include receiving a notification from the compromised one of the plurality of endpoints, or receiving a notification from one of the plurality of endpoints other than the compromised one of the plurality of endpoints that identifies the compromised endpoint. The compromise may also or instead be based on network traffic. For example, detecting the compromised one of the plurality of endpoints may include detecting potentially malicious traffic to or from the compromised one of the plurality of endpoints at the network device. Network traffic may also be monitored outside or at the perimeter of the subnet, and notifications of traffic-based detections may be received from other entities in the enterprise network infrastructure. For example, malicious traffic may be detected at a firewall or other component outside the subnet, and detecting the compromised endpoint may include receiving a notification from the firewall (or other device) outside the subnet. Where a source of such traffic is unclear, such as where address information is lost or obscured by an intervening network device or obfuscated by the (compromised) source, detecting the compromise may further include querying each of the endpoints coupled to a subnet to identify a source of the potentially malicious traffic.

As shown in step 1106, the method 1100 may include blocking traffic between the compromised one of the plurality of endpoints and the enterprise network outside the subnet. That is, the network device may be operated to prevent communications by the compromised device beyond the subnet in order to restrict potentially malicious activity and contain the compromised (or potentially compromised) device within the subnet.

As noted above, detection of a compromised endpoint may include querying endpoints within a subnet to identify a source of malicious network traffic. In this case, remedial behavior of the network device may depend specifically on whether the source can be identified. Thus, for example, when the source is identified, blocking traffic may include preventing communications through the network device by the source, and when the source is not identified, blocking traffic may include preventing communications by any of the endpoints in the subnet through the network device. Using this technique, the network device may continue to permit external network activity by healthy endpoints on the subnet so long as the specific endpoint that is sourcing malicious traffic can be identified. However, if it is not possible to identify the specific endpoint sourcing the malicious traffic, the network device may operate conservatively to block all external network communications (except perhaps with a threat management facility or other remediation tool) until the compromised endpoint can be located and remediated.

As shown in step 1108, the method 1100 may include managing healthy endpoints, e.g., in a manner consistent with securing the subnet and enterprise network in the presence of a compromised endpoint. In one aspect, this may include directing one or more of the plurality of endpoints other than the compromised one of the plurality of endpoints on the subnet to stop network communications on the subnet with the compromised one of the plurality of endpoints. In this manner, other endpoints within the subnet may cooperate with the network device to isolate the potentially harmful endpoint, even within a subnet that permits direct peer communications, e.g., through a shared medium of an Ethernet network. This may also or instead include directing communications from endpoints on the subnet other than the compromised endpoint through a virtual private network, which may physically pass through the network device or may physically circumvent the network device, e.g., by using another wireless access point, cellular communications, or any other alternative connection to secure network connectivity. As a further security measure, a security status of other endpoints on the subnet may be evaluated and used to further control traffic through the network device. Thus, for example, managing healthy endpoints may include determining a security status of each of the one or more of the plurality of endpoints other than the compromised one of the plurality of endpoints and permitting network communications through the network device only from devices meeting one or more security conditions such as the presence of a secure heartbeat or an explicit indication of security compliance from a local security agent.

According to the foregoing, there is disclosed herein a network device including a first network interface to an external network, a second network interface to a subnet, one or more processors, and a memory bearing instructions executable by the one or more processors. The instructions may be executable by the one or more processors to control operation of the network device to secure a plurality of endpoints connected to the subnet by performing the steps of detecting a compromised one of the plurality of endpoints on the subnet, blocking traffic between the compromised one of the plurality of endpoints and the external network outside the subnet, and directing one or more of the plurality of endpoints other than the compromised one of the plurality of endpoints to stop network communications on the subnet with the compromised one of the plurality of endpoints.

Figure 12:
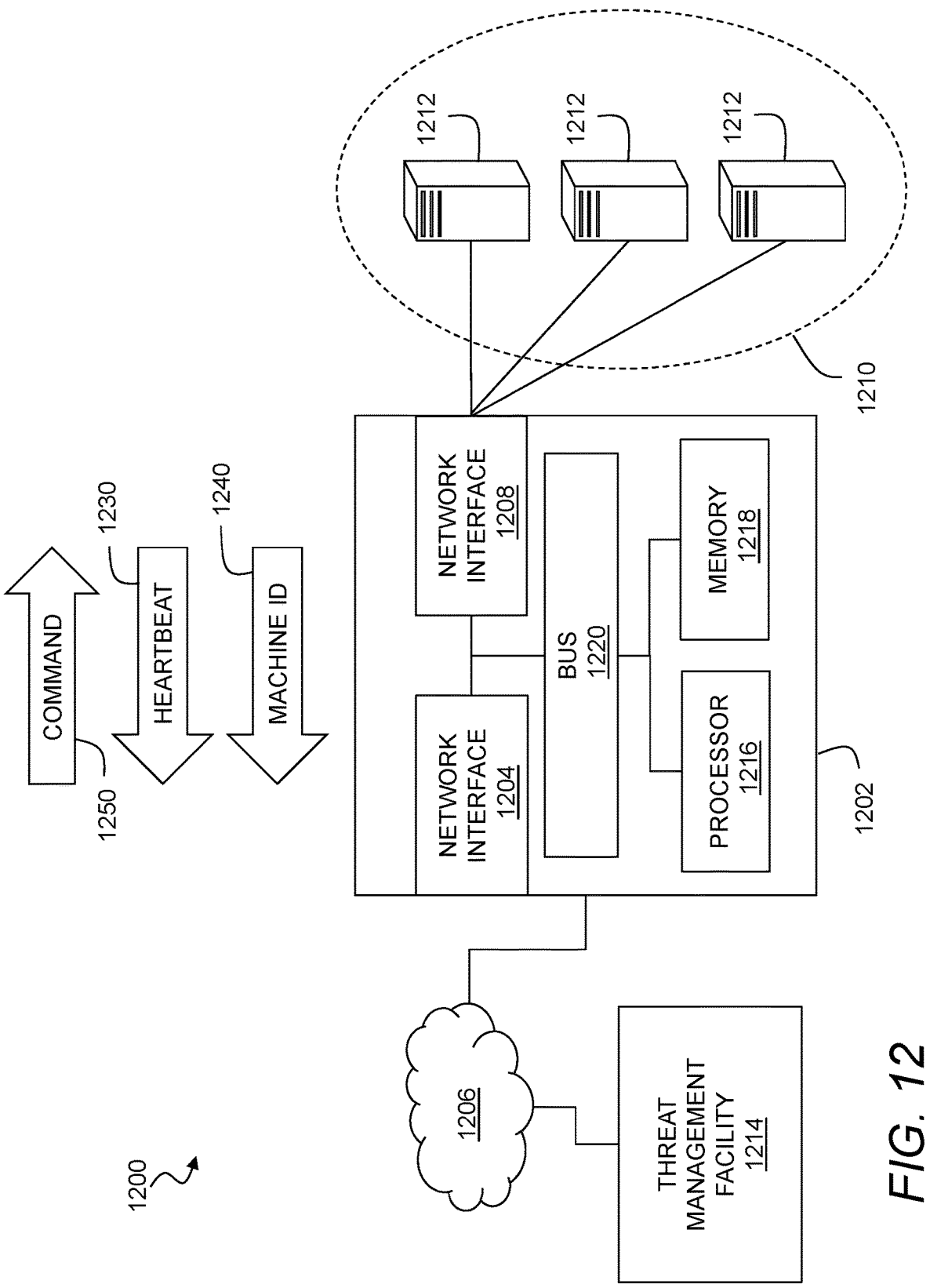
FIG. 12 shows a system including a network device that transparently processes security information between networks.

FIG. 12 shows a system including a network device that transparently processes security information between networks. In general, the network device 1202 may be configured to pass out-of-band security information such as heartbeats, notifications of compromise, device identification information, and so forth between logical or physical network partitions such as subnets, routing domains, access points, and so forth. This technique can advantageously facilitate integrated management of endpoints across network boundaries that might otherwise interfere with the identification and management of specific devices.

The network device 1202 may include a first network interface 1204 coupled to an enterprise network 1206 such as any of the enterprise networks or other data networks described herein. The network device 1202 may also include a second network interface 1208 coupled to a subnet 1210 of the enterprise network 1206 containing a number of endpoints 1212. The system 1200 may also include a threat management facility 1214, such as any of the threat management facilities described herein, which may be internally or externally (e.g., through a gateway to a public data network) coupled to the enterprise network 1206 at any suitable location for managing security of devices associated with the enterprise network 1206.

The network device 1202 may also include a processor 1216 and a memory 1218 coupled to the network interfaces 1204, 1208 and other components of the network device 1202 through a system bus 1220. The network device 1202 may, for example, include a firewall, a switch, a router, a network address translation device, or any of the other network devices described herein, as well as combinations of the foregoing. In general, the processor 1216 of the network device 1202 may be configured by computer executable code stored in the memory 1218 (and executable by the processor 1216) to manage network communications between the enterprise network 1206 and the endpoints 1212 coupled to the subnet 1210. In this capacity, the network device 1202 may, for example, manage communications between routing domains with different address spaces, such as by translating network traffic between a first routing prefix for the enterprise network and a second routing prefix for the subnet of the enterprise network.

In order to support secure management of endpoints, e.g., by the threat management facility 1214 in a heterogeneous enterprise network environment, the network device 1202 may be configured to pass out-of-band information from one of the endpoints 1212 coupled to the subnet 1210 to a security infrastructure for the enterprise network 1206 and to pass out-of-band security control information from the security infrastructure to one or more of the endpoints 1212 coupled to the subnet 1210. In this context, the security infrastructure that might usefully send or receive such out-of-band security control information includes the threat management facility 1214, as well as other network devices including routers, firewalls, gateways, and the like that manage communications within the enterprise network 1206. This may also or instead include local security agents on endpoints such as the endpoints 1212 in the subnet 1210, which may usefully generate security information (such as heartbeats) or receive security information as generally contemplated herein.

Out-of-band information, as used herein, is intended to refer to control information that is communicated between devices within a network using any suitable communication channel independent from in-band data communications to and from network endpoints. This may, for example, include a separate physical channel, a separate logical channel, or a separately coded channel within the main physical or logical channel. Out-of-band data will typically use addressing and handling independent from other data packets, however it is also possible to embed out-of-band information within in-band communications, e.g., in a packet header or within an encrypted payload or the like, provided that a device at a destination address is configured to detect and retrieve the out-of-band information. Where no out-of-band communications are supported by a network device, out-of-band communications may be supported within in-band data packets, or by securing other physical channels (e.g., other wireless access points, cellular communications) to provide out-of-band communications between devices.

By way of non-limiting example, the out-of-band information from one of the endpoints 1212 in the subnet 1210 may include a heartbeat 1230 such as a secure heartbeat from one or more of the endpoints 1212. As described herein, the heartbeat 1230 may be provided on some scheduled basis from an endpoint 1212, or the heartbeat 1230 may be responsive to a query from the threat management facility 1214. The heartbeat 1230 may include any information useful for the security infrastructure of the enterprise network 1206 such as security status information for one of the endpoints 1212, network identification information for one of the endpoints 1212, local subnet identification information for identifying a location of the one of the endpoints 1212 outside the subnet 1210, and so forth. This local subnet identification information may be particularly useful as a tool for identifying a specific endpoint in a heterogeneous environment where IP address information may be changed or obscured by intervening network devices. Thus, for example, the local subnet identification information may include a media access control address for one of the endpoints 1212, a subnet internet protocol address for one of the endpoints 1212, or any other useful information. In one aspect, the local subnet identification information includes a five-tuple for the one of the endpoints 1212 including a source IP address, a destination IP address, a source port number, a destination port number, and an IP protocol number associated with a network connection. Although this may not provide a global machine identifier, it may usefully provide enough identifying information to unambiguously locate a sender or receiver within a subnet 1210.

Other machine identification information may also or instead usefully be provided in the out-of-band information, either within the heartbeat 1230 or as a separate communication as indicated by the second arrow 1240 shown in the figure labeled "machine ID." For example, the out-of-band information may include an SSH fingerprint for the one of the endpoints 1212.

Other information, such as control information, may also be communicated using the out-of-band communication channel. For example, the out-of-band security control information may include a command 1250 such as an isolation command instructing one of the endpoints 1212 to stop communications with a second one of the endpoints 1212 coupled to the subnet 1210. This instruction may originate from the network device 1202, from the threat management facility 1214, from another one of the endpoints 1212 in the subnet 1210, or any other source within the enterprise network 1206 that might detect malicious activity or an unmanaged device as generally describe herein. In one aspect, heartbeat information and other out-of-band communications may be addressed using globally unique machine identifiers for the enterprise network 1206 so that unidirectional or bidirectional communications between endpoints 1212 and other elements of the security infrastructure can be maintained independent from IP addressing schemes and routing domains across the enterprise network 1206. Other control information may also or instead be communicated within the enterprise network 1206, such as a request for network identification information (e.g., from the network device 1202 to one of the endpoints 1212, so that the network device 1202 can identify the endpoint 1212 in out-of-band communications to other entities in the enterprise network 1206). Control information may also or instead include a request for security status from, e.g., the threat management facility 1214, to one of the endpoints 1212 within the subnet 1210.

In one aspect, the processor 1216 for the network device 1202 may be configured to convert network addresses in any manner useful for managing communications and/or routing out-of-band communications as needed. Thus, for example, the processor 1216 may convert network addresses such as external or enterprise network IP addresses into subnet addresses such as an internet protocol address for one of the endpoints 1212 on the subnet 1210. In another aspect, the processor 1216 may convert a network address for one of the endpoints 1212 on the subnet 1210 into a media access control address for the second one of the endpoints 1212 on the subnet 1210. This latter conversion may, for example, facilitate identification of the endpoint 1212 by security infrastructure such as the threat management facility 1214 independent of the IP address, which may change as network traffic traverses the heterogeneous network.

More generally, the network device 1202 may be configured to transparently communicate security information bidirectional between endpoints 1212 on the subnet 1210 and other elements of the security infrastructure for the enterprise network 1206. With this capability, the threat management facility 1214 may advantageously provide integrated security services across a heterogeneous network having a number of different routing domains, network devices, and so forth.

Figure 13:
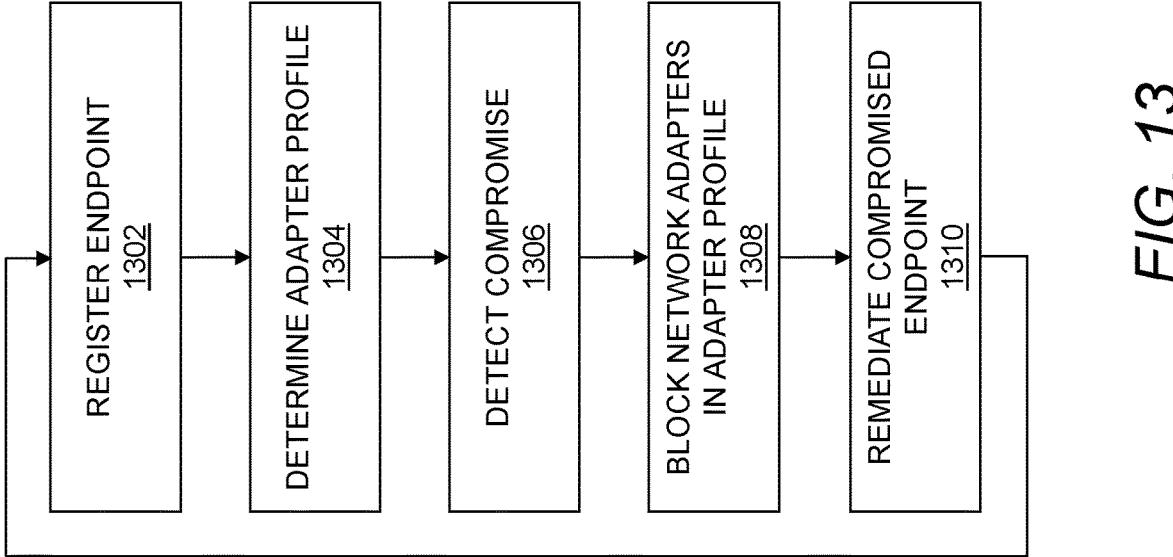
FIG. 13 shows a method for managing devices based on groups of network adapters.

FIG. 13 shows a method for managing devices based on groups of network adapters. As discussed above, one of the challenges of heterogeneous networks may be unambiguously locating and managing a device in a network environment that spans multiple network devices and routing domains. Another challenge may arise when a single device has multiple network interfaces capable of coupling to an enterprise network through multiple physical and logical channels. In this context, secure management of an enterprise network can be improved by creating a network adapter fingerprint for an endpoint that identifies all of the network adapters for that endpoint. With this information, the location and connectivity of the endpoint can be tracked and managed independent of the manner in which the endpoint is connecting to the enterprise network.

As shown in step 1302, a method 1300 for managing a network device may include registering an endpoint to an enterprise network, such as by using any of the techniques described herein. For example, registering the endpoint may include registering the endpoint in a device database through a device management portal for the enterprise network. Registering the endpoint may also or instead include bringing the endpoint into compliance with a security policy for the enterprise or otherwise ensuring that the endpoint is compliant with the security policy for the enterprise network, e.g., using any of the techniques described herein.

As shown in step 1304, the method 1300 may include determining a network adapter profile for the endpoint. This adapter profile or adapter fingerprint may include one or more media access control identifiers for network adapters associated with the endpoint or used by the endpoint for network communications, such as a wireless network interface, a network interface card for an Ethernet connection or the like, a universal serial bus controller, a Bluetooth interface, a cellular network interface, and so forth. The adapter profile may be determined, e.g., by querying the endpoint to identify relevant devices and MAC identifiers, or, where a local security agent for the endpoint is configured to locally gather and report this information, by querying the local security agent, e.g., from a threat management facility or other security device for the enterprise network. This may include querying the endpoint from a network device for the enterprise network. This may also or instead include extracting adapter information from a heartbeat received from the endpoint.

As shown in step 1306, the method 1300 may include detecting a compromised state of the endpoint at a threat management facility of an enterprise network, for example by using any of the techniques described herein. For example, this may include detecting a compromised state that brings the endpoint out of compliance with the security policy for the enterprise network. Detecting a compromised state may also or instead include detecting malware on the endpoint, detecting potentially malicious behavior of software executing on the endpoint, detecting network suspicious or malicious network activity, and so forth. More generally, any technique or combination of techniques for detecting the malicious behavior, detecting the presence of malicious or suspicious code, or otherwise detecting deviations from a security policy for an enterprise network may be used to detect a compromised state as contemplated herein. The detection may also occur at various locations within the enterprise network. For example, detecting the compromised state may include receiving a notification from the endpoint of the compromised state, detecting potentially malicious network communications to or from the endpoint, or some combination of these.

As shown in step 1308, the method 1300 may include blocking network communications by all of the network adapters in the network adapter profile at one or more firewalls. This may generally include any firewall within or associated with the enterprise network, such as a firewall on a gateway between the enterprise network and an external network, or a firewall on a router in the enterprise network. More generally, the one or more firewalls may include firewalls on one or more of a gateway, a router, a network address translation device, an endpoint, or any other network device or network-attached device. In this manner, the compromised device may be prevented from circumventing firewalls or other restrictions on network communications across the enterprise by preventing hardware on the endpoint from attempting connections using other potential network interfaces.

As shown in step 1310, the method 1300 may include remediating the compromised endpoint using any suitable local or remote tools. Where necessary, the method 1300 may return to step 1302 where the endpoint is re-registered to the enterprise network, or once the endpoint is remediated, the firewall(s) may stop blocking network communications by the endpoint and the endpoint may resume use of network resources.

According to the foregoing, there is also disclosed herein a network device for managing endpoints in an enterprise network that includes a first network interface coupled to the enterprise network, a second network interface coupled to a subnet of the enterprise network, and a processor configured by computer executable code stored in a memory and executable by the processor to manage network connectivity for a plurality of endpoints coupled to the subnet. The processor may further be configured to secure the enterprise network against access by compromised endpoints by performing the steps of registering an endpoint to the enterprise network, determining a network adapter profile for the endpoint, the network adapter profile including a plurality of media access control identifiers for a plurality of network adapters used by the endpoint for network communications, detecting a compromised state of the endpoint at a threat management facility of an enterprise network, and blocking network communications by all of the network adapters in the network adapter profile at one or more firewalls of the enterprise network.

The above systems, devices, methods, processes, and the like may be realized in hardware, software, or any combination of these suitable for a particular application. The hardware may include a general-purpose computer and/or dedicated computing device. This includes realization in one or more microprocessors, microcontrollers, embedded microcontrollers, programmable digital signal processors or other programmable devices or processing circuitry, along with internal and/or external memory. This may also, or instead, include one or more application specific integrated circuits, programmable gate arrays, programmable array logic components, or any other device or devices that may be configured to process electronic signals. It will further be appreciated that a realization of the processes or devices described above may include computer-executable code created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software. In another aspect, the methods may be embodied in systems that perform the steps thereof, and may be distributed across devices in a number of ways. At the same time, processing may be distributed across devices such as the various systems described above, or all of the functionality may be integrated into a dedicated, standalone device or other hardware. In another aspect, means for performing the steps associated with the processes described above may include any of the hardware and/or software described above. All such permutations and combinations are intended to fall within the scope of the present disclosure.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another aspect, any of the systems and methods described above may be embodied in any suitable transmission or propagation medium carrying computer-executable code and/or any inputs or outputs from same.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it may be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

The method steps of the implementations described herein are intended to include any suitable method of causing such method steps to be performed, consistent with the patentability of the following claims, unless a different meaning is expressly provided or otherwise clear from the context. So, for example performing the step of X includes any suitable method for causing another party such as a remote user, a remote processing resource (e.g., a server or cloud computer) or a machine to perform the step of X. Similarly, performing steps X, Y and Z may include any method of directing or controlling any combination of such other individuals or resources to perform steps X, Y and Z to obtain the benefit of such steps. Thus, method steps of the implementations described herein are intended to include any suitable method of causing one or more other parties or entities to perform the steps, consistent with the patentability of the following claims, unless a different meaning is expressly provided or otherwise clear from the context. Such parties or entities need not be under the direction or control of any other party or entity, and need not be located within a particular jurisdiction.

It will be appreciated that the methods and systems described above are set forth by way of example and not of limitation. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context. Thus, while particular embodiments have been shown and described, it will be apparent to those skilled in the art that various changes and modifications in form and details may be made therein without departing from the spirit and scope of this disclosure and are intended to form a part of the invention as defined by the following claims, which are to be interpreted in the broadest sense allowable by law.

What is claimed is:

1. A system comprising:
an enterprise network including a gateway coupling a heterogeneous network of devices in the enterprise network to an external network;
a plurality of endpoints connected to the heterogeneous network, each one of the endpoints configured by a local security agent executing independently of a threat management facility to monitor for a local detection of compromise, to self-isolate the endpoint on which the local security agent is executing from other endpoints of the enterprise network in response to the local detection of compromise, to shun a first one of the other endpoints in response to a notification of compromise of the first one of the other endpoints received over the enterprise network directly from a first local security agent of the first one of the other endpoints, and to shun the first one of the other endpoints in response to the notification of compromise of the first one of the other endpoints received over the enterprise network directly from a second local security agent of a second one of the other endpoints; and
a switch coupling the plurality of endpoints to the heterogeneous network, the switch managed by the threat management facility for the enterprise network, the switch configured to forward the notification of compromise from the local security agent of one of the plurality of endpoints to the threat management facility, the notification identifying the one of the other endpoints for which a compromise is detected, and to receive a request from the threat management facility responsive to the notification of compromise to isolate the one of the other endpoints from communications through the switch, wherein the one of the other endpoints is configured to isolate from the plurality of endpoints connected to the switch via shunning each of the plurality of endpoints in response to a receipt of the notification of compromise from the one of the other endpoints, and wherein the one of the other endpoints is configured to isolate from other devices in the heterogenous network via the request from the threat management facility for the switch to isolate the one of the other endpoints from communication through the switch.

2. The system of claim 1, wherein the threat management facility monitors the plurality of endpoints and creates the request to isolate the one of the other endpoints when a compromised endpoint is detected.

3. The system of claim 2, wherein the threat management facility is a remote threat management facility accessible to the switch through the external network.

4. The system of claim 2, wherein the threat management facility is a local threat management facility executing within the enterprise network.

5. A system comprising:
a plurality of endpoints connected to a heterogeneous network of devices in an enterprise network, each of the endpoints executing, independently of a threat management facility, a local security agent configured to monitor for a local detection of compromise, to self-isolate the endpoint on which the local security agent is executing from other endpoints of the enterprise network in response to the local detection of compromise, to shun a first one of the other endpoints in response to a notification of compromise of the first one of the other endpoints received over the enterprise network directly from a first local security agent of the first one of the other endpoints, and to shun the first one of the other endpoints in response to the notification of compromise of the first one of the other endpoints received over the enterprise network directly from a second local security agent of a second one of the other endpoints; and
a switch coupling the plurality of endpoints to the heterogeneous network, the switch configured to forward the notification of compromise from the local security agent of one of the plurality of endpoints to the threat management facility of the enterprise network, the notification identifying a compromised one of the other endpoints for which a compromise is detected, and the switch configured to receive a request from the threat management facility responsive to the notification to isolate the compromised one of the other endpoints from communications through the switch, wherein the one of the other endpoints is configured to isolate from the plurality of endpoints connected to the switch via shunning by each of the plurality of endpoints in response to a receipt of the notification of compromise from the one of the other endpoints, and wherein the one of the other endpoints is configured to isolate from other devices in the heterogenous network via the request from the threat management facility for the switch to isolate the one of the other endpoints from communication through the switch.

6. The system of claim 5, wherein the switch receives the request to isolate from a firewall for the enterprise network.

7. The system of claim 5, wherein the switch receives the notification of compromise from one of the plurality of endpoints.

8. The system of claim 5, wherein the switch is managed by the threat management facility.

9. The system of claim 5, further comprising a router coupled to the switch.

10. The system of claim 5, further including a gateway coupling the heterogeneous network of devices in the enterprise network to an external network.

11. The system of claim 5, further comprising a wireless access point coupled to the switch.

12. The system of claim 5, wherein the switch responds to the request from the threat management facility by preventing the plurality of endpoints from communicating through the switch.

13. The system of claim 5, wherein the switch responds to the request from the threat management facility by preventing the compromised one of the other endpoints from communicating through the switch.

14. The system of claim 5, wherein the threat management facility is a remote threat management facility accessible to the switch through a gateway and an external network.

15. The system of claim 5, wherein the threat management facility is a local threat management facility executing within the enterprise network.

16. The system of claim 5, wherein the threat management facility monitors a heartbeat from each of the plurality of endpoints and detects the compromise based on at least one of contents of the heartbeat or an absence of the heartbeat.

17. The system of claim 5, wherein a portion of the heterogeneous network includes a logical subnet having a different routing prefix than a remaining portion of the heterogeneous network.

18. The system of claim 17, wherein a network address translation device of the enterprise network translates between the different routing prefix of the subnet and a routing prefix for the remaining portion of the heterogeneous network.

19. The system of claim 5, wherein a portion of the heterogeneous network includes a physical subnet having a different routing prefix than a remaining portion of the heterogeneous network.

20. The system of claim 5, wherein the plurality of endpoints includes at least one of a desktop computer, a laptop computer, a mobile phone, or a tablet.

* * * * *